(12) United States Patent
Wang et al.

(10) Patent No.: US 10,392,301 B2
(45) Date of Patent: Aug. 27, 2019

(54) INTEGRATION OF ELECTROCHROMIC FILMS ON A SUBSTRATE

(71) Applicant: Furcifer Inc., Menlo Park, CA (US)

(72) Inventors: Jian Wang, Fremont, CA (US); Yan Zhou, Fremont, CA (US)

(73) Assignee: Furcifer Inc., Fremont, CA (US)

( * ) Notice: Subject to any disclaimer, the term of this patent is extended or adjusted under 35 U.S.C. 154(b) by 73 days.

(21) Appl. No.: 15/399,852

(22) Filed: Jan. 6, 2017

(65) Prior Publication Data

US 2017/0298682 A1    Oct. 19, 2017

Related U.S. Application Data

(60) Provisional application No. 62/349,841, filed on Jun. 14, 2016, provisional application No. 62/323,407, filed on Apr. 15, 2016.

(51) Int. Cl.

| | |
|---|---|
| *G02F 1/15* | (2019.01) |
| *C03C 17/36* | (2006.01) |
| *B32B 7/12* | (2006.01) |
| *B32B 17/10* | (2006.01) |
| *G02F 1/153* | (2006.01) |
| *G02F 1/1523* | (2019.01) |
| *E06B 9/24* | (2006.01) |
| *C03C 17/34* | (2006.01) |
| *G02F 1/1524* | (2019.01) |
| *E06B 3/67* | (2006.01) |

(52) U.S. Cl.
CPC .............. *C03C 17/366* (2013.01); *B32B 7/12* (2013.01); *B32B 17/10513* (2013.01); *B32B 17/10779* (2013.01); *C03C 17/34* (2013.01); *C03C 17/3655* (2013.01); *C03C 17/3668* (2013.01); *E06B 9/24* (2013.01); *G02F 1/15* (2013.01); *G02F 1/153* (2013.01); *G02F 1/1523* (2013.01); *G02F 1/1524* (2019.01); *C03C 2217/94* (2013.01); *C03C 2217/948* (2013.01); *E06B 3/6722* (2013.01); *E06B 2009/2464* (2013.01)

(58) Field of Classification Search
CPC . G02F 1/15; G02F 1/157; G02F 1/153; G02F 1/1508; G02F 1/1533
USPC ................................. 359/265, 274, 290, 293
See application file for complete search history.

(56) References Cited

U.S. PATENT DOCUMENTS

| | | | |
|---|---|---|---|
| 5,253,100 A * | 10/1993 | Yang | ......................... G02F 1/15 359/266 |
| 5,825,526 A | 10/1998 | Bommarito et al. | |
| 7,864,398 B2 | 1/2011 | Dozeman et al. | |
| 8,638,487 B2 * | 1/2014 | Veerasamy | ....... B32B 17/10045 359/265 |
| 9,778,533 B2 * | 10/2017 | Bertolini | ................. G02F 1/163 |

(Continued)

FOREIGN PATENT DOCUMENTS

| | | |
|---|---|---|
| WO | 2014/121263 A1 | 8/2014 |
| WO | 2017/218682 A1 | 12/2017 |

OTHER PUBLICATIONS

International Search Report and Written Opinion for Application No. PCT/US2017/037510, dated Oct. 17, 2017, 9 pages.

(Continued)

*Primary Examiner* — William Choi

(57) ABSTRACT

The present disclosure relates generally to methods for the integration of electrochromic films onto a substrate, such as a glass window, and the systems/structures formed via such methods.

18 Claims, 21 Drawing Sheets

(56) References Cited

U.S. PATENT DOCUMENTS

| | | | |
|---|---|---|---|
| 2006/0262377 A1* | 11/2006 | Kojima | G02F 1/155 359/265 |
| 2007/0153355 A1* | 7/2007 | Huang | G02F 1/1521 359/265 |
| 2009/0029263 A1 | 1/2009 | Zaghig et al. | |
| 2017/0298682 A1 | 10/2017 | Wang et al. | |
| 2017/0299932 A1 | 10/2017 | Wang et al. | |

OTHER PUBLICATIONS

Non-Final Office Action dated Sep. 7, 2018, issued in related U.S. Appl. No. 15/487,325 (10 pages).

* cited by examiner

INTEGRATION OF ELECTROCHROMIC FILMS ON A SUBSTRATE

CROSS-REFERENCE TO RELATED APPLICATION

This application is based on and claims priority to U.S. Provisional Application No. 62/349,841, filed Jun. 14, 2016, entitled "Integration of Electrochromic Films on a Substrate," and 62/323,407, filed Apr. 15, 2016, titled "Solid Polymer Electrolyte for Electrochromic Devices." The entire contents of the above-referenced applications are all incorporated herein by reference.

FIELD OF THE INVENTION

The invention generally relates to methods for the integration of electrochromic films, which comprise a solid state electrolyte disposed therein, on a substrate, and the resulting systems/structures.

BACKGROUND

Electrochromism generally refers to a reversible change in optical properties of a material upon application of a potential. In particular, electrochromic materials exhibit a reversible color change due to an electrochemical reduction-oxidation (redox) reaction caused by application of an electric field.

Electrochromic materials are useful for a variety of applications, including photovoltaic devices, field effect transistors, organic light emitting diodes, general printed electronics, anti-glare window and display systems, etc. For applications involving smart window technology, the electrochromic materials need to be integrated with a glass substrate (e.g., a glass window) to become serviceable.

There is a thus a need to develop new and/or improved structures integrating electrochromic materials with desired substrates (e.g., glass). Likewise, there is also a need to develop new and/or improved methods of integrating electrochromic materials with a desired substrate that involve cost effective, efficient, and reproducible processes.

BRIEF SUMMARY

The present disclosure provides unique methods for the integration of flexible electrochromic films comprising a solid state electrolyte disposed therein onto a desired substrate (e.g., a glass window). The present disclosure additionally describes the unique systems/structures formed via such methods.

In one embodiment, a method for directly applying an electrochromic film to a surface of a substrate is provided, where the electrochromic film comprises a solid state electrolyte disposed therein, and where the method comprises: selecting an electrochromic film having at least one adhesive surface configured to adhere to a surface of a substrate, wherein the electrochromic film comprises an additional layer coupled to the adhesive surface; removing the additional layer from the electrochromic film to expose the adhesive surface; and contacting the exposed adhesive surface of the electrochromic film directly to the surface of the substrate to apply the electrochromic film thereto.

In another embodiment, a method for forming a structure having an electrochromic film comprising a solid state electrolyte disposed therein is provided, where the method comprises: interposing an electrochromic film between a first adhesive interlayer and a second adhesive interlayer, wherein the first adhesive interlayer is interposed between the electrochromic film and a first substrate, and the second adhesive interlayer is interposed between the electrochromic film and a second substrate; and bonding the electrochromic film to the first substrate via the first adhesive interlayer, and to the second substrate via the second adhesive interlayer, to form a laminated structure having the electrochromic film therein.

In yet another embodiment, a structure comprising at least one electrochromic film comprising a solid state electrolyte disposed therein is provided, where the method comprises: a first panel having a first surface and a second surface; a second panel having a third surface and a fourth surface, the third surface of the second panel facing toward the second surface of the first panel; and a spacer interposed between the first panel and the second panel. A low-emissivity coating is deposited on at least one of the second surface of the first panel and the third surface of the second panel. An electrochromic film comprising a solid state electrolyte therein is deposited on at least one of the first surface of the first panel, the second surface of the first panel, the third surface of the second panel, and the fourth surface of the second panel, with the proviso that the electrochromic film and the low-emissivity coating are not deposited on a same surface at a same time.

In a further embodiment, a structure comprising at least one laminated structure having an electrochromic film disposed therein is provided, where the electrochromic film comprises a solid state electrolyte disposed therein, and where the structure comprises: a first panel having a first surface and a second surface; a second panel having a third surface and a fourth surface, the third surface of the second panel facing toward the second surface of the first panel; and a spacer interposed between the first panel and the second panel. A low-emissivity coating is deposited on at least one of the second surface of the first panel, and the third surface of the second panel. At least one of the first panel and the second panel comprises a laminated structure having an electrochromic film disposed therein.

In an additional embodiment, a multi-panel structure having an electrochromic film associated with at least one of the panels is provided, where the electrochromic film comprises a solid state electrolyte disposed therein, and where the multi-panel structure comprises: a first panel having a first surface and a second surface; a second panel having a third surface and a fourth surface; and a central panel interposed between the first panel and the second panel, the central panel having a fifth surface facing toward the second surface of the first panel, and a sixth surface facing toward the third surface of the second panel. The first panel, the second panel and the central panel are in spaced relation with each other. A low-emissivity coating is deposited on at least one of the second surface of the first panel and the third surface of the second panel. An electrochromic film comprising a solid state electrolyte disposed therein is also associated with the central panel.

Other objects, features and advantages of the described embodiments will become apparent to those skilled in the art from the following detailed description. It is to be understood, however, that the detailed description and specific examples, while indicating exemplary embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the invention may be more readily understood by referring to the accompanying drawings in which.

DETAILED DESCRIPTION OF THE PREFERRED EMBODIMENTS

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Lamination of an Electrochromic Film on a Substrate

Figure 1:
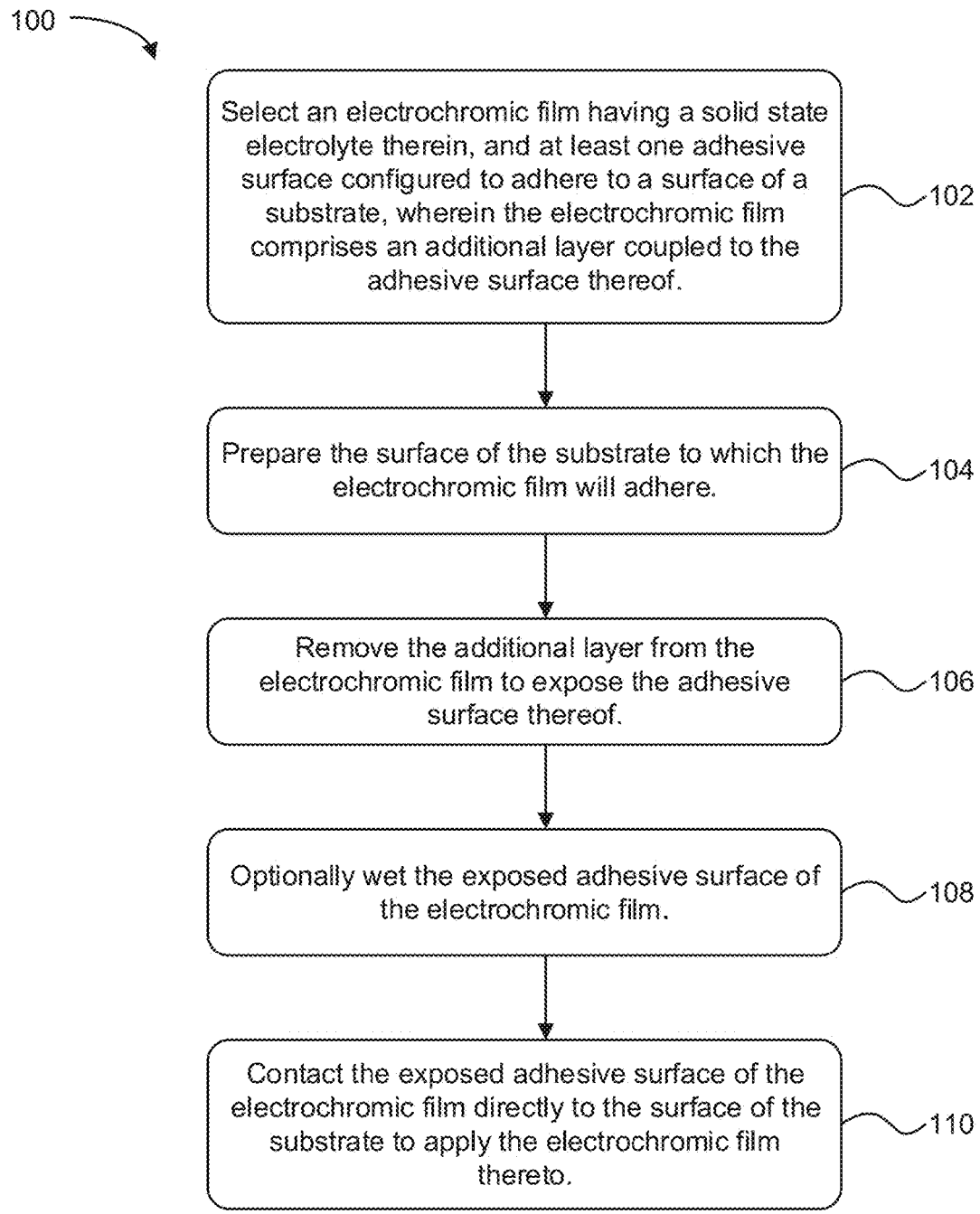
FIG. 1 is a flowchart of a method for laminating an electrochromic film on a substrate, where the electrochromic film comprises a solid state electrolyte disposed therein, according to one exemplary embodiment.

FIG. 1 illustrates a flowchart of a method 100 for laminating an electrochromic film on a substrate, where the electrochromic film comprises a solid state electrolyte therein, according to one exemplary embodiment. The method 100 may be implemented to construct any of the structures/components/devices described herein, such as those described with reference to other embodiments and/or FIGS. The method 100 may be carried out in any desired environment, and may include more or less steps than those described and/or illustrated in FIG. 1.

As shown in FIG. 1, the method 100 may include selecting an electrochromic film having a solid state electrolyte disposed therein (included within/inside the electrochromic film), and at least one adhesive surface configured to adhere to a surface of a substrate. See step 102. The electrochromic film may also include an additional layer, e.g., a liner, coupled to the adhesive surface thereof. This additional layer coupled to, and covering at least a portion, a majority, or preferably an entirety of the adhesive surface of the electrochromic film, may help prevent the electrochromic film from adhering to undesired/unintended surfaces, as well as prematurely adhering to the desired/intended surface of the substrate.

Selection of the electrochromic film may include first measuring the substrate to determine the dimensions thereof, and selecting and/or fabricating an electrochromic film with at least one dimension equivalent and/or substantially complementary to the corresponding dimensions of the substrate. In certain embodiments, the dimensions (e.g., width, height, etc.) of the selected electrochromic film may be about equal to the corresponding dimensions of the substrate such that the electrochromic film, when adhered to the substrate surface, may cover the entirety thereof. In certain embodiments, at least one of the dimensions (e.g., width, height, etc.) of the selected electrochromic film may be less than the corresponding dimension(s) of the substrate such that the electrochromic film, when adhered to the substrate surface, may cover less than an entirety thereof (e.g., only a portion of the substrate surface). In certain embodiments, at least one of the dimensions (e.g., width, height, etc.) of the selected electrochromic film may be greater than the corresponding dimension(s) of the substrate such that the electrochromic film, when adhered to the substrate surface, may not only cover the entirety thereof, but also have one or more portions that overhang (extend beyond) the perimeter of the substrate surface. In such embodiments where at least one of the dimensions (e.g., width, height, etc.) of the selected electrochromic film are greater than the corresponding dimension(s) of the substrate, additional processing steps may be required to remove the overhanging portion(s) of the electrochromic film (the portion(s) of the electrochromic film not adhered to the substrate's surface).

In certain embodiments, the substrate may comprise a transparent material. In one embodiment, the substrate may be a transparent glass substrate. In a particular embodiment, the substrate may be a transparent glass window.

In some embodiments, the substrate may comprise a rigid (non-pliant) material; a semi-rigid (semi-pliant) material; a pliant/flexible material, and combinations thereof. A flexible substrate may be beneficial in terms of weight, ease of transportation, etc., in certain embodiments.

In various embodiments, the surface of the substrate to which the electrochromic film will adhere may be substantially flat, comprise one or more curved portions, or have any desired configuration/shape/dimensions as would be appreciated by skilled artisans upon reading the present disclosure.

As also shown in FIG. 1, the method 100 includes preparation of the surface of the substrate to which the electrochromic film will adhere. See step 104. In some embodiments, such preparation may include cleaning the substrate surface via one or more processes as would be appreciated by skilled artisans upon reading the present disclosure. As used herein, the term "adhere" refers to the state in which two surfaces are held, bonded, or otherwise coupled together.

The method 100 further includes removing the additional layer from the electrochromic film to expose the adhesive surface thereof. See step 106. After removal of the additional layer from the electrochromic film, the method 100 may optionally include wetting (e.g., applying a predetermined amount of a fluid, such as water or an aqueous fluid) the exposed adhesive surface. See step 108.

As additionally shown in FIG. 1, the method 100 includes contacting the exposed adhesive surface of the electrochromic film to the substrate surface, thereby laminating/adhering the electrochromic film to the substrate surface. See step 110. In preferred embodiments, the method 100 results in laminating/adhering the electrochromic film directly on the substrate surface.

While not shown in FIG. 1, the method 100 may include one or more processing steps, including, but not limited to, applying pressure to the electrochromic film laminated on the substrate, wetting the electrochromic film (e.g., via a squeegee) laminated on the substrate, and subsequently drying the electrochromic film laminated on the substrate, etc.

Figure 2:
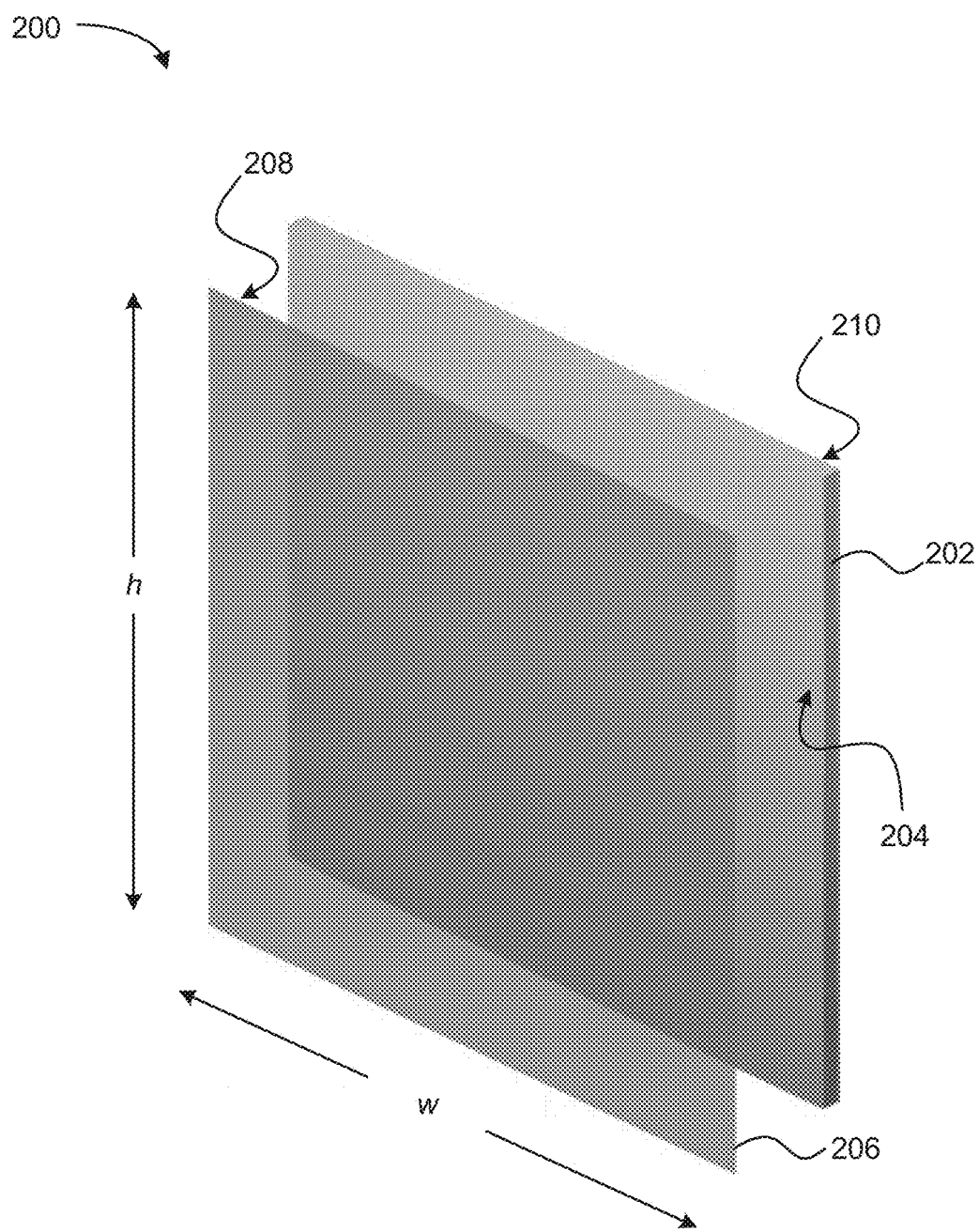
FIG. 2 is a simplified schematic of a substrate on which an electrochromic film is directly laminated, where the electrochromic film comprises a solid state electrolyte disposed therein, according to one exemplary embodiment.

A simplified schematic of a structure comprising an electrochromic film laminated directly on a substrate is shown in FIG. 2, according to one exemplary embodiment. For clarity purposes only, the various components of the structure (e.g., the electrochromic film and substrate) are shown spaced apart. Moreover, while not shown in FIG. 2, the electrochromic film may comprise a solid state electrolyte disposed therein.

As shown in FIG. 2, the structure 200 comprises a substrate 202 (e.g., glass) having a first surface 204 to which the electrochromic film 206 adheres. The electrochromic film 206 has an adhesive surface 208, which is coupled to an additional layer (not shown in FIG. 2) prior to lamination with the substrate 202. As indicated above, laminating/adhering the electrochromic film 206 to the first surface 204 of the substrate 202 may include at least the steps of removing the additional layer coupled to the adhesive surface 208 of the electrochromic film 206, and contacting the adhesive surface 208 directly to the first surface 204 of the substrate 202.

As shown in the embodiment of FIG. 2, the substrate 202 and the electrochromic film 206 have about an equal width, w, relative to one another, as well as about an equal height, h, relative to one another.

In certain embodiments the electrochromic film 206 may be applied and adhered to the first surface 204 of the substrate 202, or a second surface (e.g., surface 210) of the substrate 202. For instance, in embodiments where the substrate 202 may be a glass window, such as a glass window in a building, car, aircraft, etc., the surfaces 204, 210 may correspond to an interior surface and an exterior surface of the window, respectively.

In some embodiments, the electrochromic film 206 may be applied and adhered to the first surface 204 of the substrate 202, and at least a second electrochromic film may be applied and adhered to at least one other surface of the substrate 202.

Interposition of an Electrochromic Film within a Laminated Structure

Figure 3:
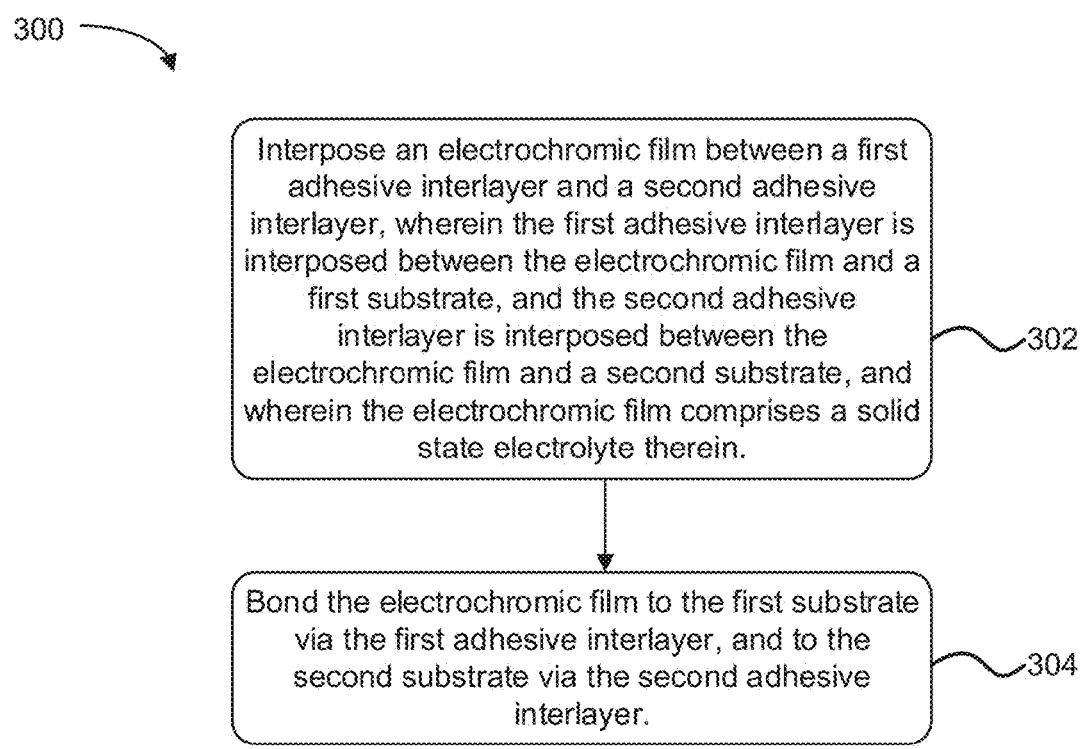
FIG. 3 is a flowchart of a method for interposing an electrochromic film within a laminated structure, where the electrochromic film comprises a solid state electrolyte disposed therein, according to one exemplary.

FIG. 3 illustrates a flowchart of a method 300 for interposing an electrochromic film within a laminated structure, where the electrochromic film comprises a solid state electrolyte disposed therein, according to one exemplary embodiment. The method 300 may be implemented to construct any of the structures/components/devices described herein, such as those described with reference to other embodiments and/or FIGS. The method 300 may be carried out in any desired environment, and may include more or less steps than those described and/or illustrated in FIG. 3.

As shown in FIG. 3, the method 300 includes interposing (e.g., sandwiching) an electrochromic film between a first adhesive interlayer and a second adhesive interlayer. The first adhesive interlayer is interposed between the electrochromic film and a first substrate, and the second adhesive interlayer is interposed between the electrochromic film and a second substrate. See step 302. As indicated above, the electrochromic film may comprise a solid state electrolyte disposed therein in some embodiments.

In certain embodiments, the first adhesive interlayer and/or the second adhesive interlayer may include a material configured to bond the electrochromic film thereto. For instance, in one embodiment, the first adhesive interlayer and/or the second adhesive interlayer may include a polymeric material, particularly a thermosetting polymer material. Suitable thermoset polymer materials may include, but are not limited to, polyvinyl butyral (PVB), ethylene-vinyl acetate (EVA), polyurethanes, etc.

In certain embodiments, the first adhesive interlayer and/or the second adhesive interlayer may comprise a material that not only is configured to bond the electrochromic film thereto, but is also transparent.

In certain embodiments, the first substrate and/or the second substrate may comprise a transparent material. In one embodiment, the first substrate and/or the second substrate may be transparent glass. In a particular embodiment, the first substrate and/or the second substrate may be a transparent glass window.

In some embodiments, the first substrate and/or the second substrate may comprise a rigid (non-pliant) material; a semi-rigid (semi-pliant) material; a pliant/flexible material, and combinations thereof.

In certain embodiments, the surface of the first substrate to which the first adhesive interlayer will bond may be substantially flat, comprise one or more curved portions, or have any desired configuration/shape/dimensions as would be appreciated by skilled artisans upon reading the present disclosure. In certain embodiments, the surface of the second substrate to which the second adhesive interlayer will bond may be substantially flat, comprise one or more curved portions, or have any desired configuration/shape/dimensions as would be appreciated by skilled artisans upon reading the present disclosure.

In certain embodiments, the corresponding dimensions (e.g., width, height, etc.) of one or more of: the first adhesive interlayer, the second adhesive interlayer, the electrochromic film, the first substrate, and the second substrate, may be about equal to one another. In one embodiment, the corresponding dimensions of each of: the first adhesive interlayer, the second adhesive interlayer, the electrochromic film, the first substrate, and the second substrate, may be about equal to one another.

As also shown in FIG. 3, the method 300 includes bonding the electrochromic film to the first substrate via the first adhesive interlayer, and bonding the electrochromic film to the second substrate via the second adhesive interlayer. See step 302.

In certain embodiments where the first adhesive interlayer and/or the second adhesive interlayer comprises a thermosetting polymer material, the bonding step may involve applying heat and/or pressure and/or UV irradiation to cross-link the electrochromic film with the first and second substrates.

Figure 4:
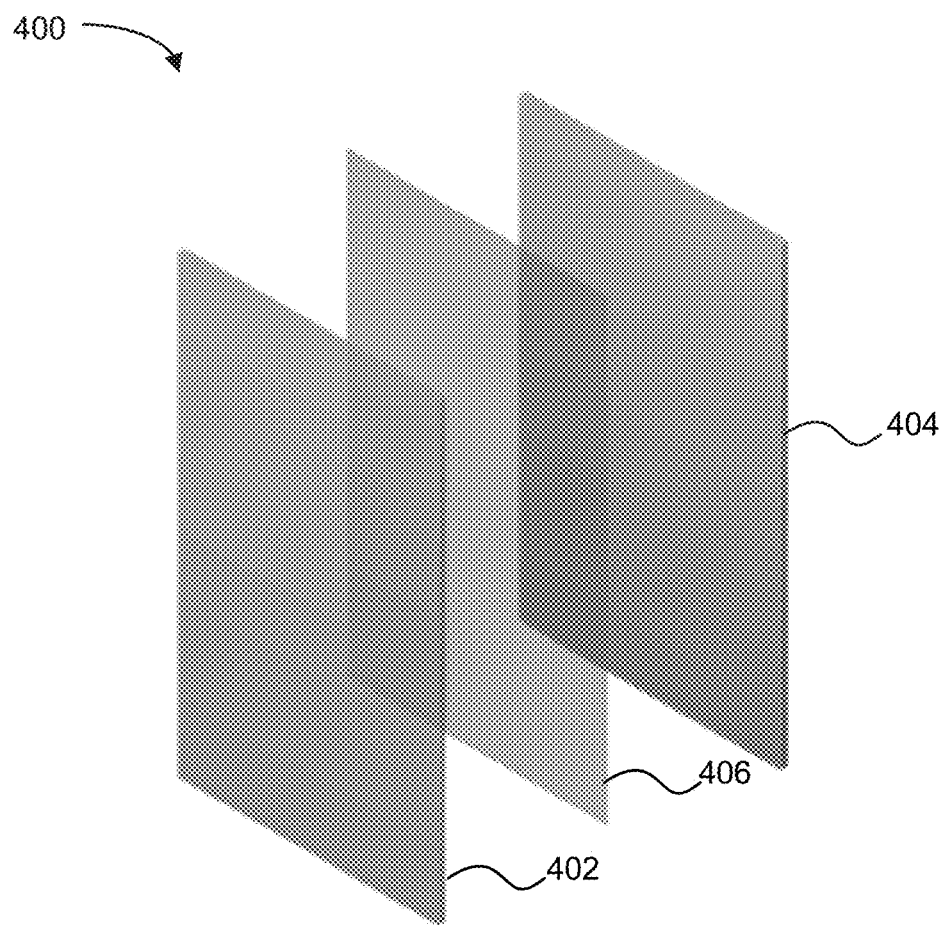
FIG. 4 is a simplified schematic of a laminated structure, according to one exemplary embodiment.

A simplified schematic of an exemplary laminated structure without an electrochromic film therein is shown in FIG. 4, according to one exemplary embodiment. For clarity purposes only, the various components of the laminated structure (e.g., substrates, and adhesive interlayers) are shown spaced apart.

As shown in FIG. 4, the laminated structure 400 is constructed in a manner that allows the structure 400 to stay together when shattered/broken, thereby providing safety protection. For instance, the laminated structure 400 comprises at least two substrates 402, 404 (e.g., each comprising glass) bonded together via an adhesive interlayer 406. The adhesive interlayer 406 is particularly configured to keep the substrates 402, 404 bonded together even when shattered/broken, where the high strength of the adhesive interlayer 406 prevents the substrates 402, 404 from breaking up into large, sharp pieces.

Figure 5:
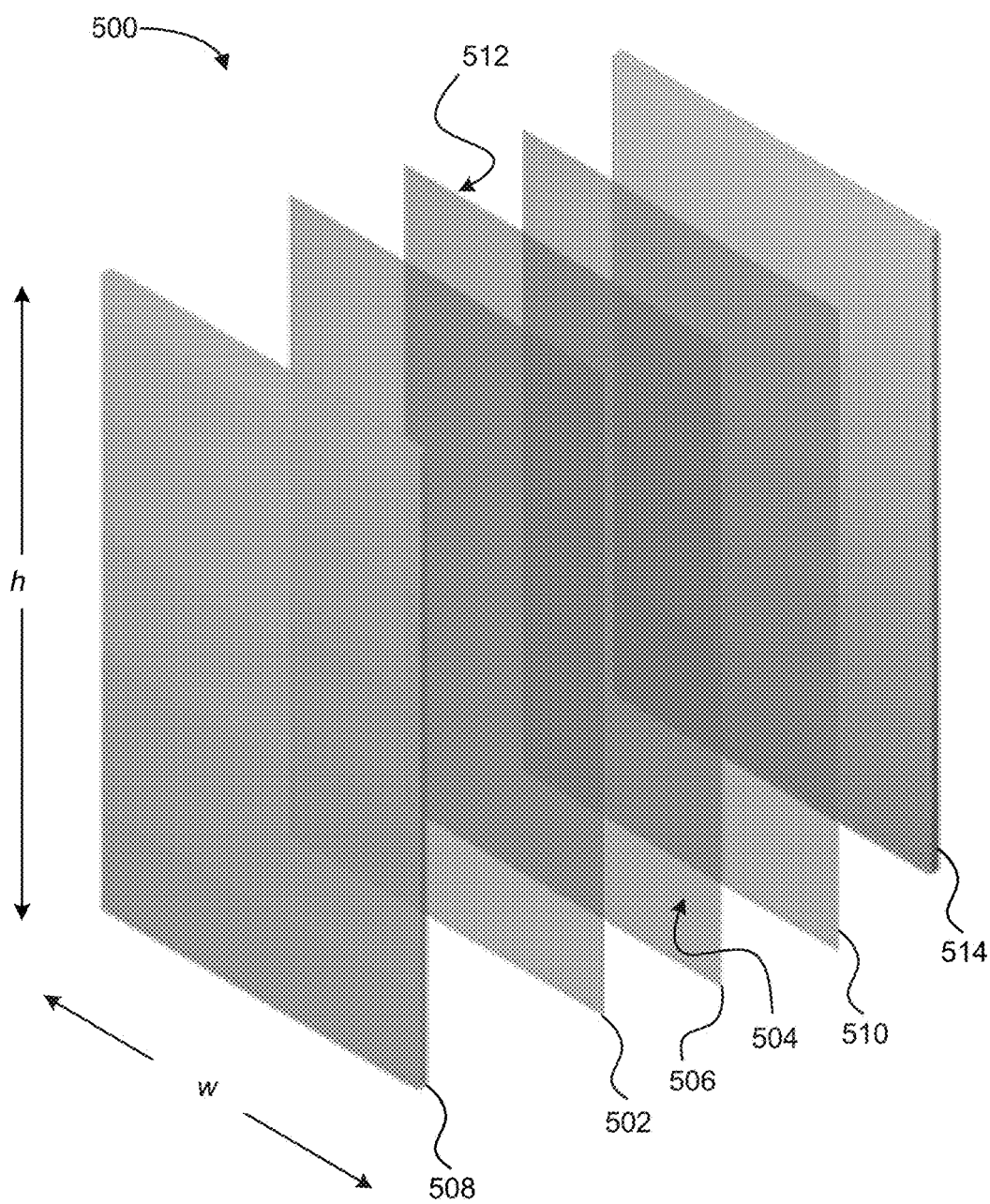
FIG. 5 is a simplified schematic of a laminated structure having an electrochromic film disposed therein, where the electrochromic film comprises a solid state electrolyte disposed therein, according to one exemplary embodiment.

A simplified schematic of a laminated structure with an electrochromic film interposed therein is shown in FIG. 5, according to one exemplary embodiment. For clarity purposes only, the various components of the laminated structure (e.g., substrates, adhesive layers, and electrochromic film) are shown spaced apart. Moreover, while not shown in FIG. 5, the electrochromic film may comprise a solid state electrolyte disposed therein.

As shown in FIG. 5, the laminated structure 500 includes a first adhesive interlayer 502 interposed between a first surface 504 of an electrochromic film 506 and a first substrate 508. The laminated structure 500 also includes a second adhesive interlayer 510 interposed between a second surface 512 of the electrochromic film 506 and a second substrate 514. As seen in the embodiment of FIG. 5, the first and second surfaces 504, 512 correspond to opposing surfaces of the electrochromic film 506.

As indicated previously, the first and/or second adhesive interlayers 502, 510 may include a material (e.g., a thermosetting polymer material) configured to securely bond (e.g., cross-link) the electrochromic film 506 with the first and second substrates 508, 514. As such, the first and/or second adhesive interlayers 502, 510 are configured to keep the laminated structure 500 together even when shattered/broken, and prevent the laminated structure 500 from breaking up into large, sharp pieces.

As shown in the embodiment of FIG. 5, the first substrate 508, the first adhesive interlayer 502, the electrochromic film 506, the second adhesive interlayer 510, and the second substrate 514 may each have about an equal width, w, as one another, as well as about an equal height, h, as one another; however, this need not be the case in other embodiments.

In certain embodiments, the laminated structure 500 may be suitable for use as an exterior window of a car, building, aircraft, etc. in certain embodiments. In some embodiments, such a laminated structure 500 may be suitable for use as a curtain wall.

Figure 6:
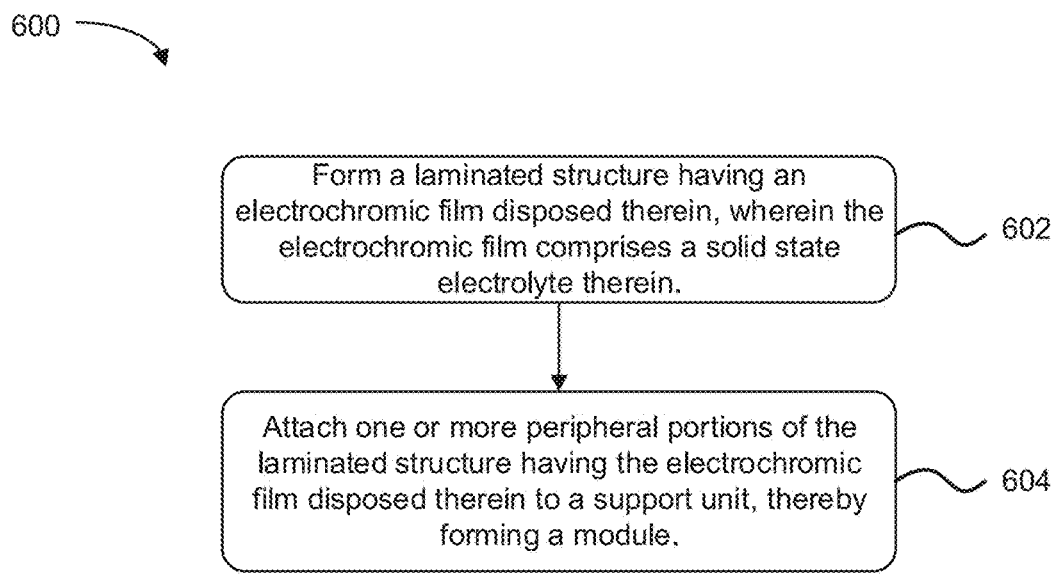
FIG. 6 is a flowchart of a method for forming a module comprising a laminated structure with an electrochromic film, where the electrochromic film comprises a solid state electrolyte disposed therein, according to one exemplary embodiment.

Forming a Module Comprising an Electrochromic Film Disposed within a Laminated Structure FIG. 6 illustrates a flowchart of a method 600 for forming a module comprising a laminated structure with an electrochromic film disposed therein, where the electrochromic film comprises a solid state electrolyte disposed therein (i.e., the solid state electrolyte is disposed/incorporated within/inside the electrochromic film), according to one exemplary embodiment. The method 600 may be implemented to construct any of the structures/components/devices described herein, such as those described with reference to other embodiments and/or FIGS. The method 600 may be carried out in any desired environment, and may include more or less steps than those described and/or illustrated in FIG. 6.

As shown in FIG. 6, the method 600 includes forming a laminated structure having an electrochromic film disposed therein, wherein the electrochromic film comprises a solid state electrolyte disposed therein. See step 602. In certain embodiments, formation of such a laminated structure may proceed according to the method 300 described in FIG. 3. For instance, formation of such a laminated structure may include: (i) interposing an electrochromic film between a first adhesive interlayer and second adhesive interlayer, the first adhesive interlayer being interposed between the electrochromic film and a first substrate, and the second adhesive interlayer being interposed between the electrochromic film and a second substrate; and (ii) bonding the electrochromic film to the first substrate via the first adhesive interlayer, and to the second substrate via the second adhesive interlayer.

In certain embodiments, the first adhesive interlayer and/or the second adhesive interlayers may include a polymeric material, particularly a thermosetting polymer material (e.g., PVB, EVA, polyurethanes, etc.), configured to bond the electrochromic film to the first and second substrates. In certain embodiments, the first adhesive interlayer and/or the second adhesive interlayer may comprise a material that not only is configured to bond the electrochromic film to the first and second substrates, but is also transparent.

In certain embodiments where the first adhesive interlayer and/or the second adhesive interlayer comprises a thermosetting polymer material, the bonding step may involve applying heat and/or pressure and/or UV irradiation to cross-link the electrochromic film with the first and second substrates.

In certain embodiments, the first substrate and/or the second substrate may comprise a transparent material. In one embodiment, the first substrate and/or the second substrate may be transparent glass. In particular embodiments, the first substrate and/or the second substrate may be a transparent glass window.

In some embodiments, the first substrate and/or the second substrate may comprise a rigid (non-pliant) material; a semi-rigid (semi-pliant) material; a pliant/flexible material, and combinations thereof.

In certain embodiments, the surface of the first substrate to which the first adhesive interlayer will bond may be substantially flat, comprise one or more curved portions, or have any desired configuration/shape/dimensions as would be appreciated by skilled artisans upon reading the present disclosure. In certain embodiments, the surface of the substrate to which the second adhesive interlayer will bond may be substantially flat, comprise one or more curved portions, or have any desired configuration/shape/dimensions as would be appreciated by skilled artisans upon reading the present disclosure.

In certain embodiments, the corresponding dimensions (e.g., width, height, etc.) of one or more of: the first adhesive interlayer, the second adhesive interlayer, the electrochromic film, the first substrate, and the second substrate, may be about equal to one another. In one embodiment, the corresponding dimensions of each of: the first adhesive interlayer, the second adhesive interlayer, the electrochromic film, the first substrate, and the second substrate, may be about equal to one another.

As further shown in FIG. 6, the method 600 includes attaching one or more peripheral portions of the laminated structure having the electrochromic film disposed therein to a support unit, thereby forming a module. See step 604. In certain embodiments, the one or more peripheral portions of the laminated structure having the electrochromic film disposed therein may attach to an inner region of the support unit. Such attachment may be achieved by way of adhesives, rubber gaskets, or other suitable fastening device/structure as would be appreciated by skilled artisans upon reading the present disclosure.

In certain embodiments, the support unit may be a frame (e.g., a window frame). In some embodiments, one or more electronic components configured to control operation of the electrochromic film may be disposed within the support unit (e.g., within at least one wall of the support unit).

In certain embodiments, the resulting module having the electronic component(s) associated therewith may be commercially available to an end user, and used for a variety of applications. For example, an end user may install the resulting module having the electronic component(s) associated therewith as an interior window, e.g. as described in FIG. 8.

Figure 7:
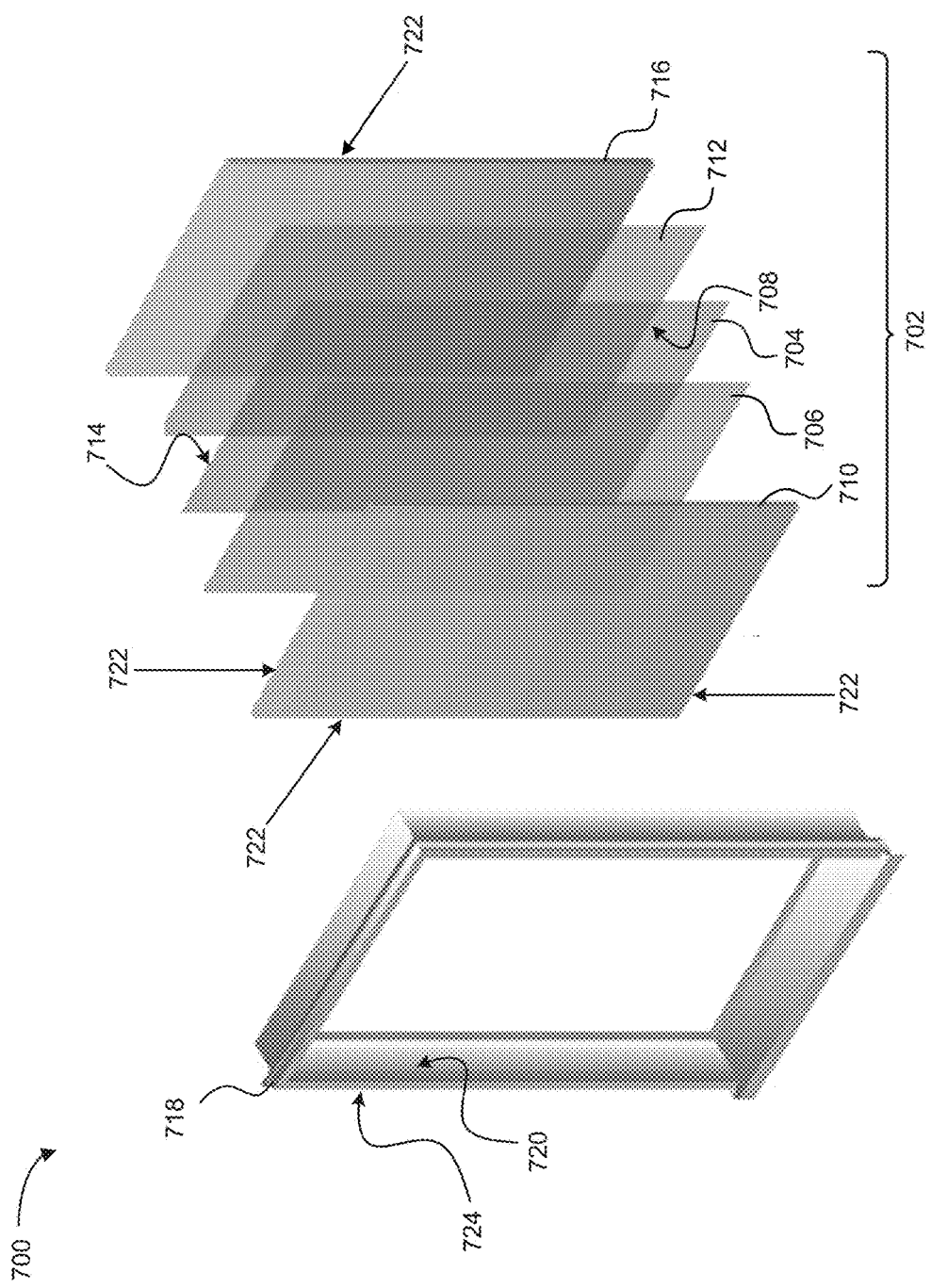
FIG. 7 is a simplified schematic of a module comprising a laminated structure with an electrochromic film disposed therein, where the electrochromic film comprises a solid state electrolyte disposed therein, according to one exemplary embodiment.

A simplified schematic of a module (e.g., a smart window module) comprising an electrochromic film disposed within a laminated structure is shown in FIG. 7, according to one exemplary embodiment. For clarity purposes only, the various components of the module (e.g., support unit, substrates, adhesive interlayers, and electrochromic film) are shown spaced apart. Moreover, while not shown in FIG. 7, the electrochromic film comprises a solid state disposed therein.

As shown in FIG. 7, the module 700 includes a laminated structure 702 with an electrochromic film 704 disposed therein. This laminated structure 702 particularly includes a first adhesive interlayer 706 interposed between a first surface 708 of the electrochromic film 704 and a first substrate 710. The laminated structure 702 also includes a second adhesive interlayer 712 interposed between a second surface 714 of the electrochromic film 704 and a second substrate 716. As seen in the embodiment of FIG. 7, the first and second surfaces 708, 714 correspond to opposing surfaces of the electrochromic film 704. In certain embodiments, the laminated structure 702 may be formed according to the method 300 of FIG. 3, and have a similar, or the same, configuration and/or composition of the structure 500 of FIG. 5.

The first and/or second adhesive interlayers 706, 712 of FIG. 7 may include a material (e.g., a thermosetting polymer material) configured to securely bond (e.g., cross-link) the electrochromic film 704 with the first and second substrates 710, 716. As such, the first and/or second adhesive interlayers 706, 712 are configured to keep the laminated structure 702 together even when shattered/broken, and prevent the laminated structure 702 from breaking up into large, sharp pieces.

As additionally shown in the embodiment of FIG. 7, the first substrate 710, the first adhesive interlayer 706, the electrochromic film 704, the second adhesive interlayer 712, and the second substrate 716 may each have about an equal width as one another, as well as about an equal height as one another; however, this need not be the case in other embodiments.

As further shown in FIG. 7, the module 700 includes a support unit 718 (e.g., a frame) having an interior region 720. The interior region 720 of the support unit 718 may be configured to fasten/attach/secure one or more peripheral portions 722 of the laminated structure 702, thereby producing the complete module 700. As discussed above, one or more electrical components configured to control operation of the electrochromic film 704 may be disposed within the support unit 718, e.g., disposed in an area located between the interior region 720 and an exterior region 724 of the support unit 718.

Figure 8:
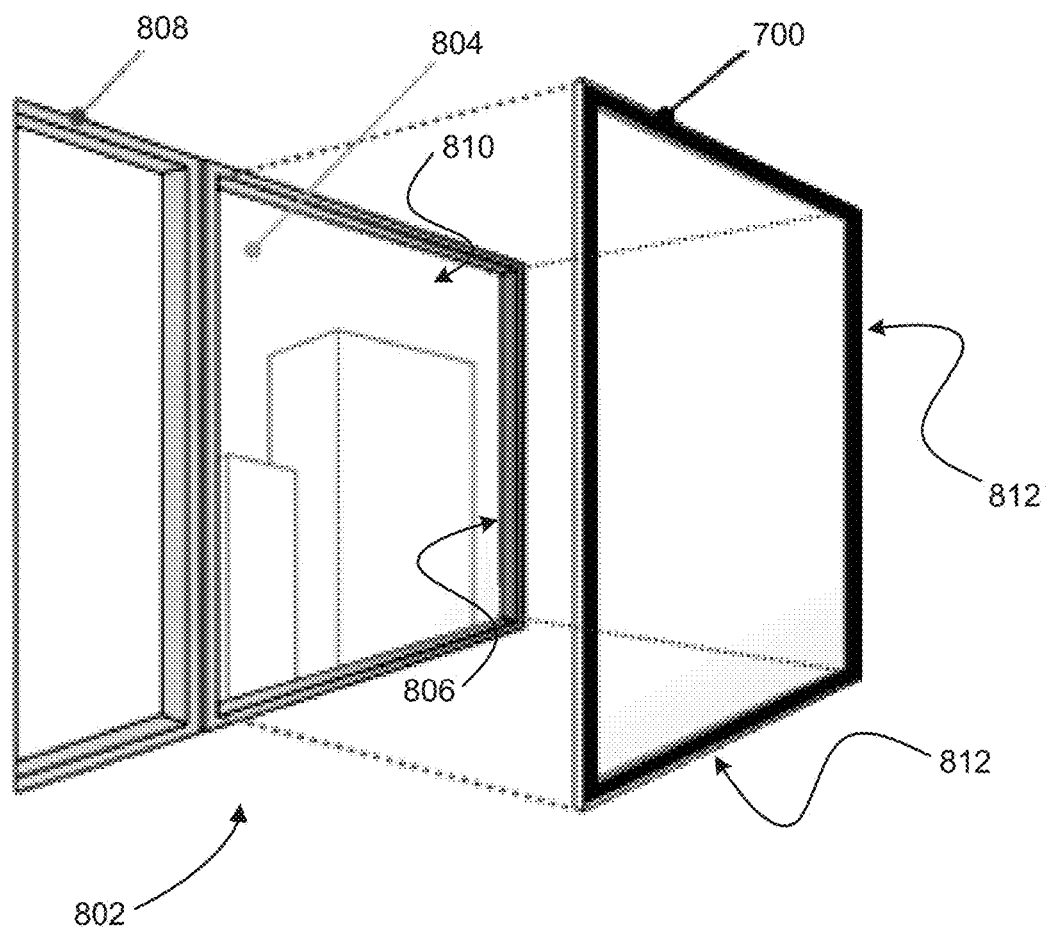
FIG. 8 is a simplified schematic of an exterior window structure having the module of FIG. 7 integrated therewith, according to one exemplary embodiment.

A simplified schematic of the module 700 of FIG. 7 installed as an interior window of an exterior window structure is shown in FIG. 8, according to one exemplary embodiment. For clarity purposes only, the various components of FIG. 8 (e.g., exterior window, module, etc.) are shown spaced apart.

As shown in FIG. 8, an exterior window structure 802 may include an exterior window 804, the peripheral portions of which are attached/secured to an inner region 806 of an exterior window frame 808. As further shown in FIG. 8, the module 700 may be positioned adjacent to, in spaced relation with, in contact with, etc., the inner surface 810 of the exterior window 804. One or more peripheral portions 812 of the module 700 may also be attached/secured to the interior region 806 of the exterior window frame 808.

Integration of an Electrochromic Film into a Structure Comprising Low-e Glass

Low-emissivity ("low-e") glass is a type of energy-efficient glass designed to reduce heat transfer between the environments located on either side thereof (e.g., between the interior of a room and the outside/outdoors). Window glass is highly thermally emissive by nature. Accordingly, to improve thermal insulation and solar optical control, specific thin-film coatings are deposited on the glass surface. Low-e coatings have been developed to minimize the amount of ultraviolet and infrared light that can pass through glass without compromising the amount of visible light that is transmitted. The low-e coating is a microscopically thin, transparent coating, which reflects long-wave infrared energy (or heat). Some low-e coatings also reflect significant amounts of short-wave solar infrared energy. To protect the low-e coating, an insulated double glazing structure may be utilized as shown in FIG. 9, according to one exemplary embodiment.

Figure 9:
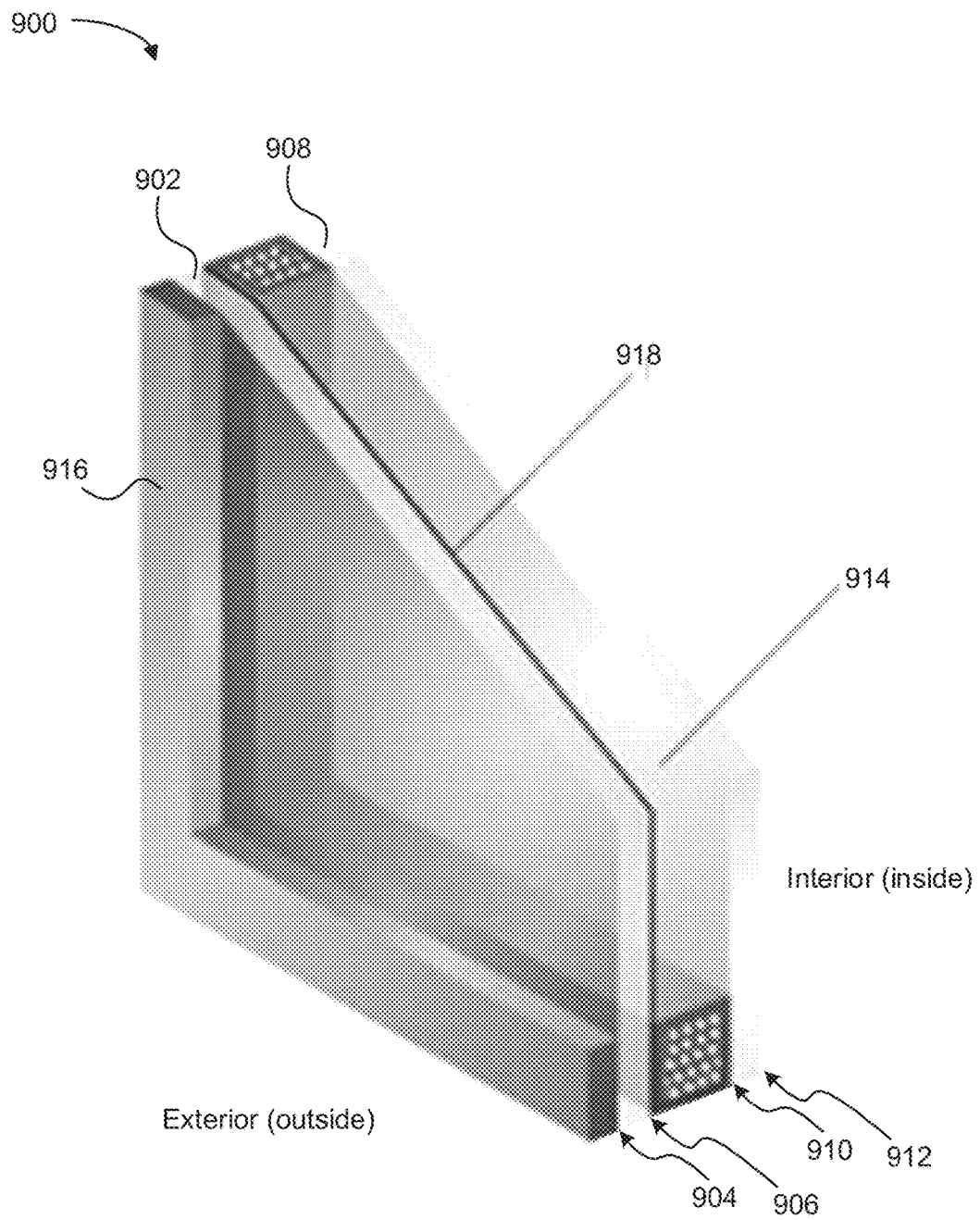
FIG. 9 is a simplified schematic of a double glazing structure having two panels and a low-emissivity coating deposited on at least one surface of at least one of the panels, according to one exemplary embodiment.

As shown in FIG. 9, the double glazing structure 900 includes a first panel 902 having a first surface 904 and second surface 906. Per the exemplary embodiment of FIG. 9, the first surface 904 of the first panel 902 faces towards, and is in contact with, an exterior environment (e.g., the outside), thus the first panel 902 may also be referred to as the exterior panel. In certain embodiments, the first panel 902 may comprise a transparent substrate, such as transparent glass. In various embodiments, the first panel 902 may comprise a rigid (non-pliant) material; a semi-rigid (semi-pliant) material; a pliant/flexible material, and combinations thereof.

The double glazing structure 900 additionally includes a second panel 908 in parallel, spaced relation with the first panel 902. The second panel 908 includes a third surface 910 and a fourth surface 912. Per the exemplary embodiment of FIG. 9, the fourth surface 912 of the second panel 902 faces towards, and is in contact with, an interior environment (e.g., the interior of a room), thus the second panel 908 may also be referred to as the interior panel. The third surface 910 of the second panel 908 faces toward the second surface 906 of the first panel 902. In certain embodiments, the second panel 908 may comprise a transparent substrate, such as transparent glass. In various embodiments, the second panel 908 may comprise a rigid (non-pliant) material; a semi-rigid (semi-pliant) material; a pliant/flexible material, and combinations thereof.

A spacer 914 may be positioned between the first and second panels 902, 908. The spacer 914 may include a polymer material, an insulating material, or other material suitable to separate panels in a double glazing structure as would be appreciated by skilled artisans upon reading the present disclosure.

The double glazing structure 900 may also include one or more support units 916 configured to secure/attach the first panel 902, the second panel 908, the spacer 914, and/or other components of the structure 900.

A low-e coating 918 may be deposited on one more surfaces of the first and/or second panels 902, 908 of the double glazing structure 900. In the exemplary embodiment of FIG. 9, a low-e coating 918 is deposited on the second surface 906 of the first panel 902. However, the position of the low e-coating 918 is not limited to the second surface 906 of the first panel 902. For instance, in some embodiments, a low e-coating 918 may be deposited on the third surface 910 of the second panel 908. In additional embodiments, a first low-coating 918 may be deposited on the second surface 906 of the first panel 902, and a second low-e coating 918 may be deposited on the third surface 910 of the second panel 908.

In some embodiments, the low-e coating 918 may be a sputtered multilayer coating comprising metals, metals oxides, and/or metal nitrides. In one embodiment, at least one of the layers of such a sputtered multilayer coating may comprise silver. In some embodiments, the low-e coating 918 may be a pyrolytic coating comprising one or more metal oxides (e.g., $SnO_2$).

In embodiments where the double glazing structure 900 comprises at least two low-e coatings 918, the coatings may have the same or different composition, optical properties, dimensions, etc. as one another.

As discussed in greater detail below, the double glazing structure 900 may comprise an electrochromic film (not shown in FIG. 9) deposited on one or more surfaces of the first and/or second panels 902, 908 (e.g., the first surface 904, the second surface 906, the third surface 910 and/or the fourth surface 912), in some embodiments. This electrochromic film preferably comprises a solid state electrolyte disposed therein. In additional embodiments, the first panel 902 and/or the second panel 908 of the double glazing structure 900 may comprise a laminated structure having an electrochromic film therein. In more embodiments, the double glazing structure 900 may include an electrochromic film positioned between the first and second panels 902, 908, where the first panel 902, the electrochromic film, and the second panel 908 are in spaced relation with each other (i.e., the first panel 902, the electrochromic film, and the second panel 908 do not come into physical contact with one another).

A. Double Glazing Structure in which at Least One Panel Includes a Laminated Structure with an Electrochromic Film Therein FIGS. 10A-10F illustrate cross-sectional views of a double glazing structure 1000 in which at least one of the panels includes a laminated structure with an electrochromic film disposed therein, and where the electrochromic film comprises a solid state electrolyte disposed therein, according to various exemplary embodiments. The double glazing structure 1000 of FIGS. 10A-10F may be implemented in combination with other devices/features/components described herein, such as those described with reference to other embodiments. The double glazing structure 1000 may also be used in various applications and/or in permutations, which may or may not be noted in the illustrative embodiments/aspects described herein. For instance, the double glazing structure 1000 may include more or less features/components than those shown in FIGS. 10A-10F, in some embodiments. Additionally, unless otherwise specified, one or more components of the double glazing structure 1000 may be of conventional material, design, and/or fabricated using known techniques, as would be appreciated by skilled artisans upon reading the present disclosure.

The double glazing structure 1000 of FIGS. 10A-10F is directed to an exemplary variation of the double glazing structure 900 of FIG. 9, and thus may have common numbering therewith. For instance, as shown in FIGS. 10A-10F, the double glazing structure 1000 includes: a first panel 902 having first and second surfaces 904, 906; a second panel 908 having third and fourth surfaces 910, 912; a spacer 914 separating the first and second panels 902, 908; one or more support units 916 configured to secure/attach one or more components of the structure 1000; and a low-e coating 918 deposited on at least one surface of at least one panel.

Figure 10A:
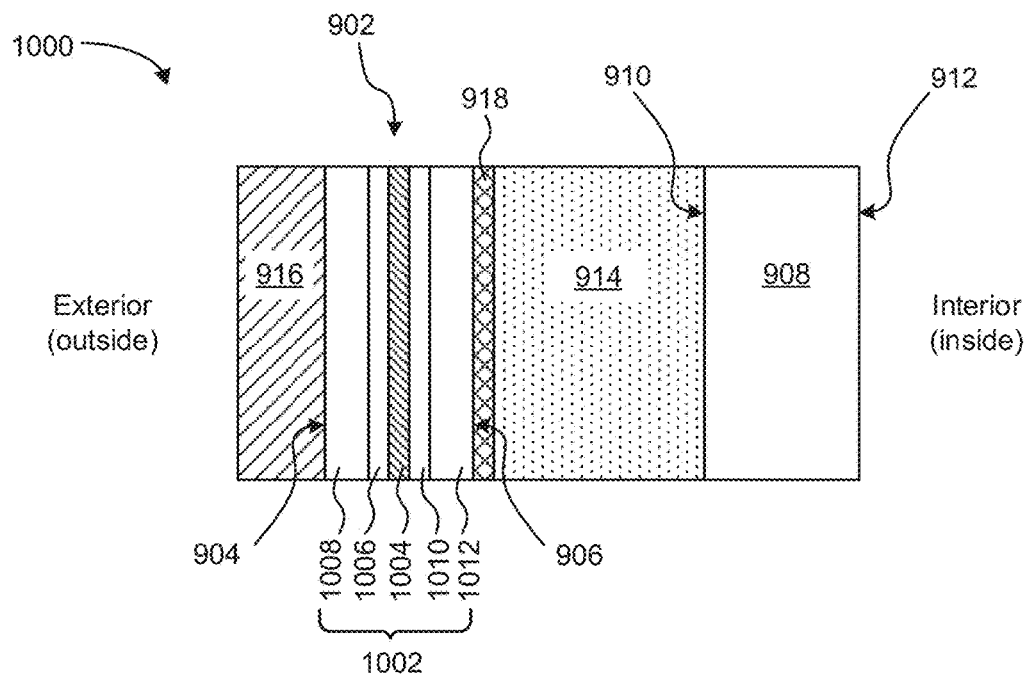
FIGS. 10A-10F are cross sectional views of a double glazing low-emissivity structure having two panels, at least one of which comprises a laminated structure having an electrochromic film disposed therein, where the electrochromic film comprises a solid state electrolyte disposed therein, according to various exemplary embodiments.

Referring first to the embodiment of FIG. 10A, the double glazing structure 1000 includes the first panel 902 and the second panel 908, where the first panel 902 has a laminated structure 1002 with an electrochromic film 1004 therein. The laminated structure 1002 comprises a first adhesive interlayer 1006 interposed between the electrochromic film 1004 and a first substrate 1008, and a second adhesive interlayer 1010 interposed between the electrochromic film 1004 and a second substrate 1012. In certain embodiments, this laminated structure 1002 may be formed according to the method 300 of FIG. 3, and have a similar, or the same, configuration and/or composition of the structure 500 of FIG. 5. Additionally, the electrochromic film 1004 may comprise a solid state electrolyte disposed therein, in some embodiments.

Figure 10B:
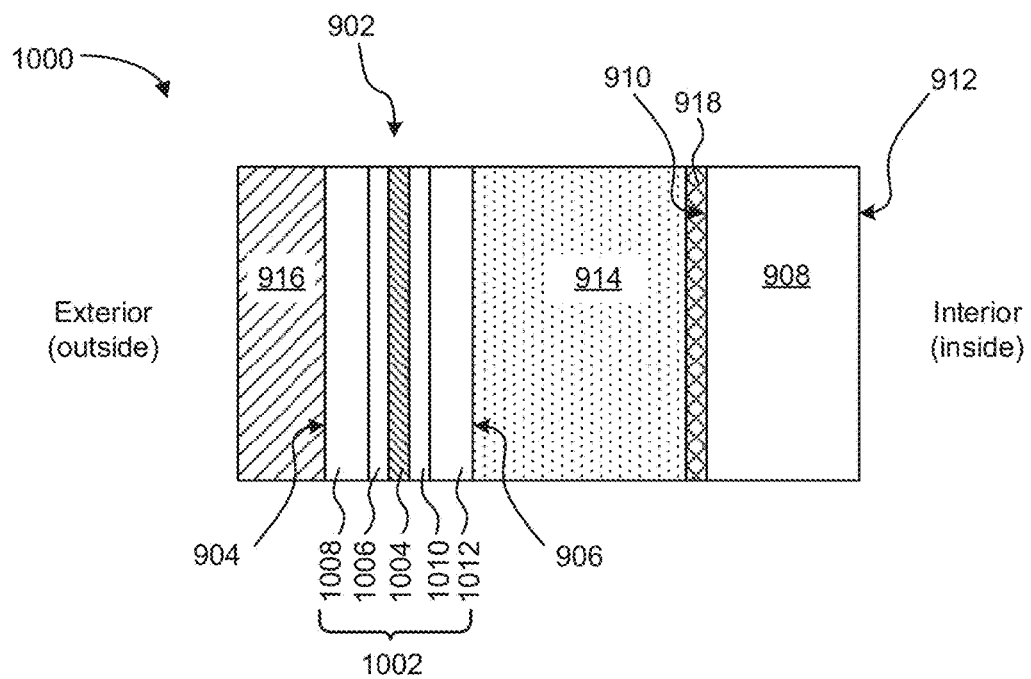
Figure 10C:
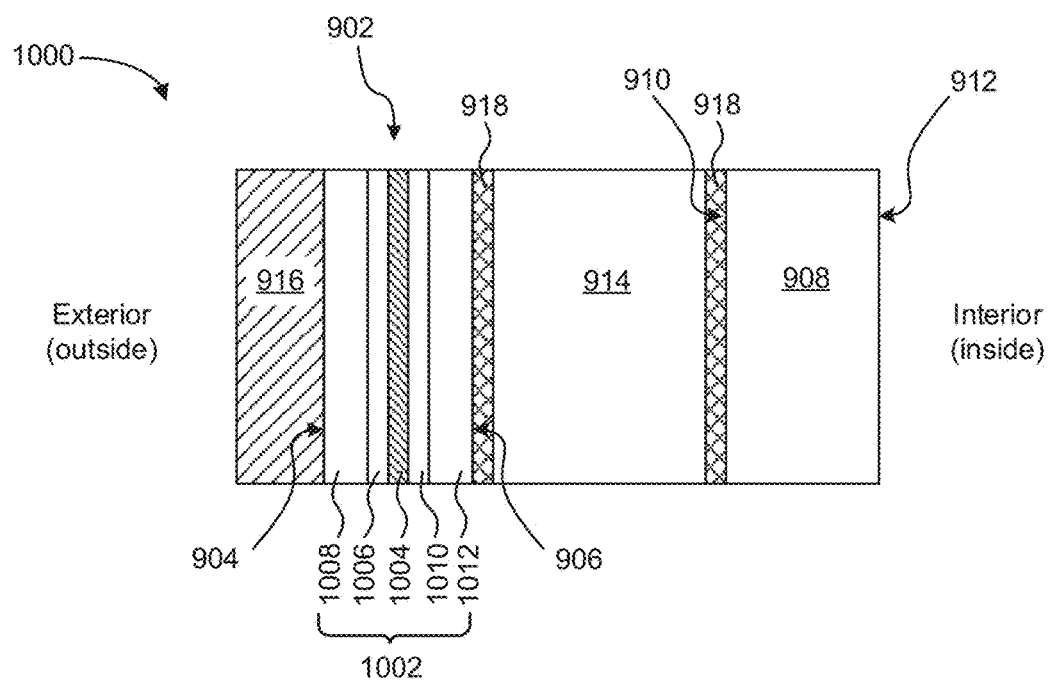

As also shown in the embodiment of FIG. 10A, the low-e coating 918 may be deposited on the second surface 906 of the first panel 902, which coincides with the inwardly facing surface of the second substrate 1012. However, in another exemplary embodiment, the low-e coating 918 may be deposited on the third surface 910 of the second panel 908, as shown in FIG. 10B. In still another exemplary embodiment, a first low-e coating 918 may be deposited on the second surface 906 of the first panel 902, and a second low-e coating 918 may be deposited on the third surface 910 of the second panel 908, as shown in FIG. 10C.

Figure 10D:
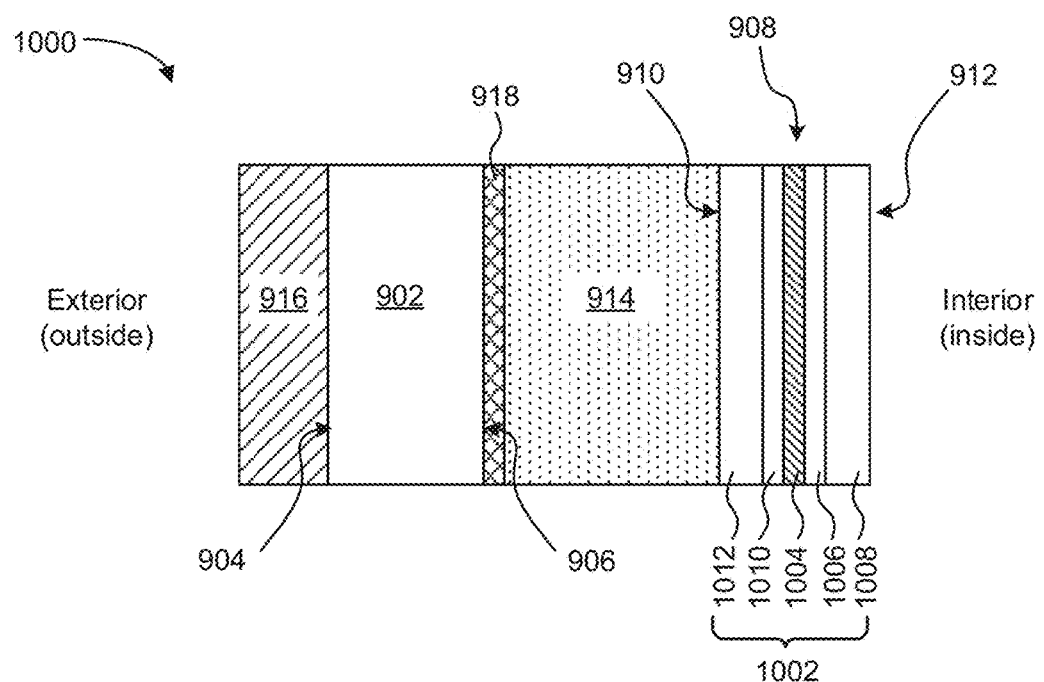
Figure 10E:
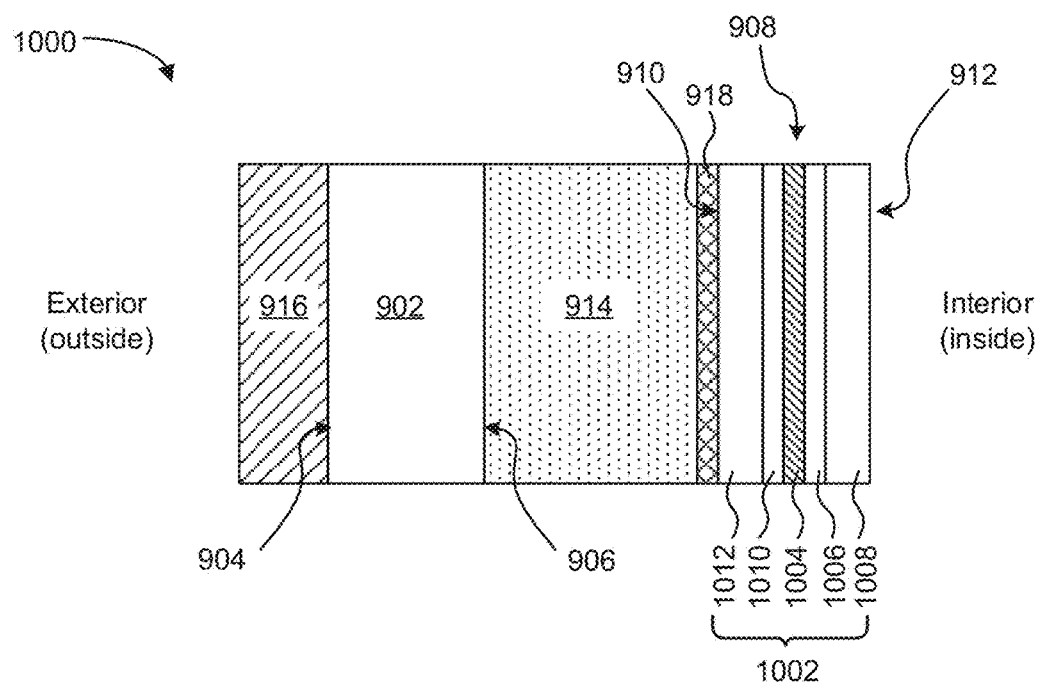
Figure 10F:
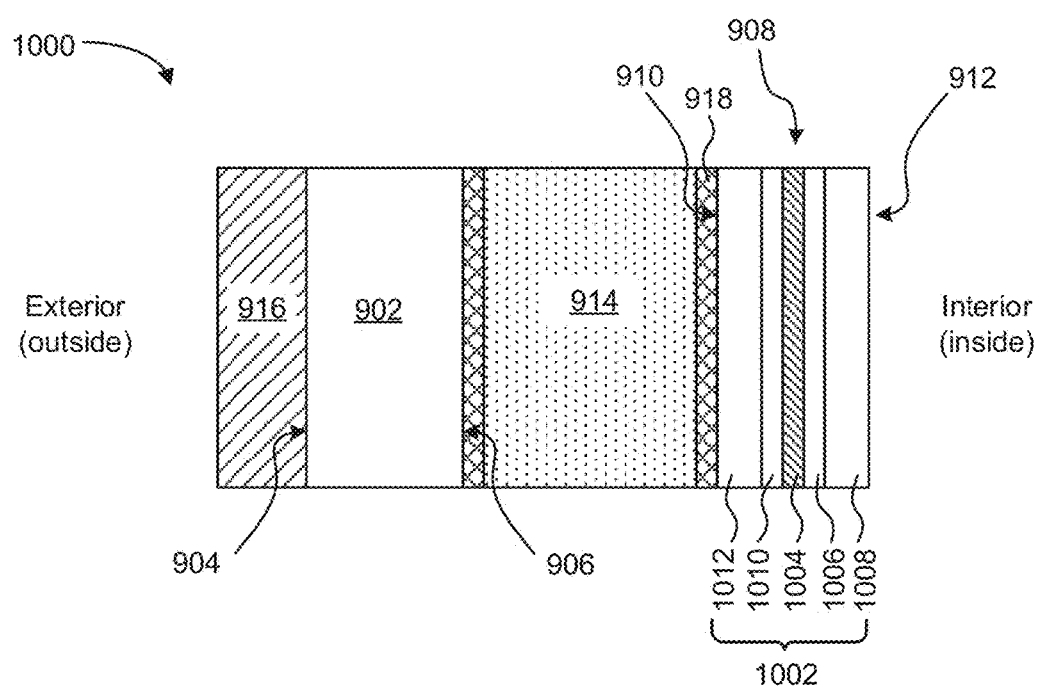

FIGS. 10D-10F illustrate embodiments in which the second panel 908 of the double glazing structure 1000 has the laminated structure 1002 with the electrochromic film 1004 therein. The low-e coating 918 may be deposited on the second surface 906 of the first panel 902 (as shown in FIG. 10D), the third surface 910 of the second panel 908 (as shown in FIG. 10E), or on both the second surface 906 of the first panel 902 and the third surface 910 of the second panel 908 (as shown in FIG. 10F).

The double glazing structure 1000 illustrated in FIGS. 10A-10F includes two panels 902, 908, where at least one of the panels includes a laminated structure 1002 with an electrochromic film 1004 disposed therein. The use of such a laminated structure with an electrochromic film disposed therein may also be applicable to glazing structures having any number of panels, such as those having more than two panels, in certain embodiments.

While not shown in FIGS. 10A-10F, the first panel 902 may have a first laminated structure 1002 with an electrochromic film 1004 therein, and the second panel 908 may have a second laminated structure 1002 with an electrochromic film 1004 therein, in some embodiments. In one such embodiment in which each of the panels 902, 908 have a laminated structure 1002 with an electrochromic film 1004 therein, a low e-coating 918 may be deposited on the second surface 906 of the first panel 902. In another such embodiment in which each of the panels 902, 908 have a laminated structure 1002 with an electrochromic film 1004 therein, a low e-coating 918 may be deposited on the third surface 910 of the second panel 908. In yet another such embodiment in which each of the panels 902, 908 have a laminated structure 1002 with an electrochromic film 1004 therein, a first low e-coating 918 may be deposited on the second surface 906 of the first panel 902, and a second low e-coating 918 may be deposited on the third surface 910 of the second panel 908.

B. Double Glazing Structure Having an Electrochromic Film Deposited on at Least One Surface of at Least One Panel FIGS. 11A-11H illustrate cross-sectional views of a double glazing structure 1100 in which at least one of the panels includes a laminated structure with an electrochromic film disposed therein, and where the electrochromic film comprise a solid state electrolyte disposed therein, according to various exemplary embodiments. The double glazing structure 1100 of FIGS. 11A-11H may be implemented in combination with other devices/features/components described herein, such as those described with reference to other embodiments. The double glazing structure 1100 may also be used in various applications and/or in permutations, which may or may not be noted in the illustrative embodiments/aspects described herein. For instance, the double glazing structure 1100 may include more or less features/components than those shown in FIGS. 11A-11H, in some embodiments. Additionally, unless otherwise specified, one or more components of the double glazing structure 1100 may be of conventional material, design, and/or fabricated using known techniques, as would be appreciated by skilled artisans upon reading the present disclosure.

The double glazing structure 1100 of FIGS. 11A-11H is directed to an exemplary variation of the double glazing structure 900 of FIG. 9, and thus may have common numbering therewith. For instance, as shown in FIGS. 11A-11H, the double glazing structure 1100 includes: a first panel 902 having first and second surfaces 904, 906; a second panel 908 having third and fourth surfaces 910, 912; a spacer 914 separating the first and second panels 902, 908; one or more support units 916 configured to secure/attach one or more components of the structure 1100; and a low-e coating 918 deposited on at least one surface of at least one panel.

Figure 11A:
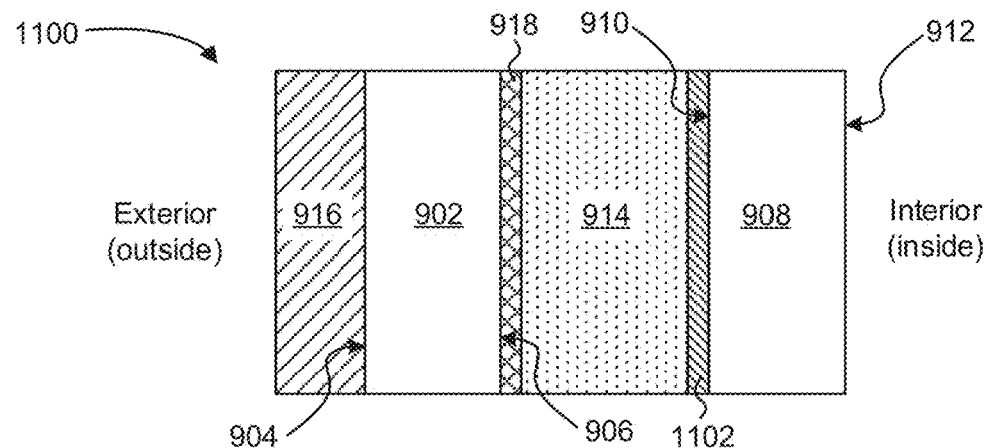
FIGS. 11A-11H illustrate cross-sectional views of a double glazing low-emissivity structure having two panel, at least one of which comprises a laminated structure having an electrochromic film disposed therein, where the electrochromic film comprises a solid state electrolyte disposed therein, according to various exemplary embodiments.
Figure 11B:
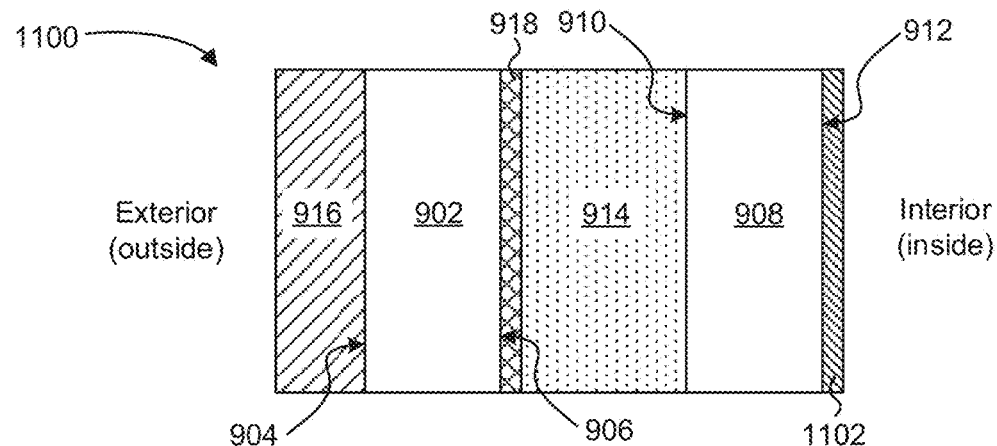
Figure 11C:
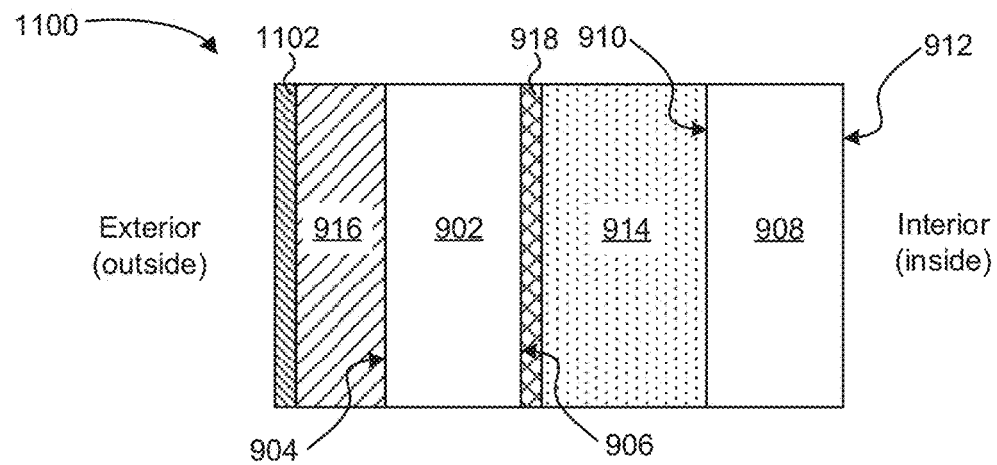

As particularly shown in the embodiments of FIGS. 11A-11C, the double glazing structure 1100 may include the low-e coating 918 deposited on the second surface 906 of the first panel 902. An electrochromic film 1102 may also be deposited on the third surface 910 of the second panel 908 (as shown in FIG. 11A), the fourth surface 912 of the second panel 908 (as shown in FIG. 11B), or on the first surface 904 of the first panel 902 (as shown in FIG. 11C).

Figure 11D:
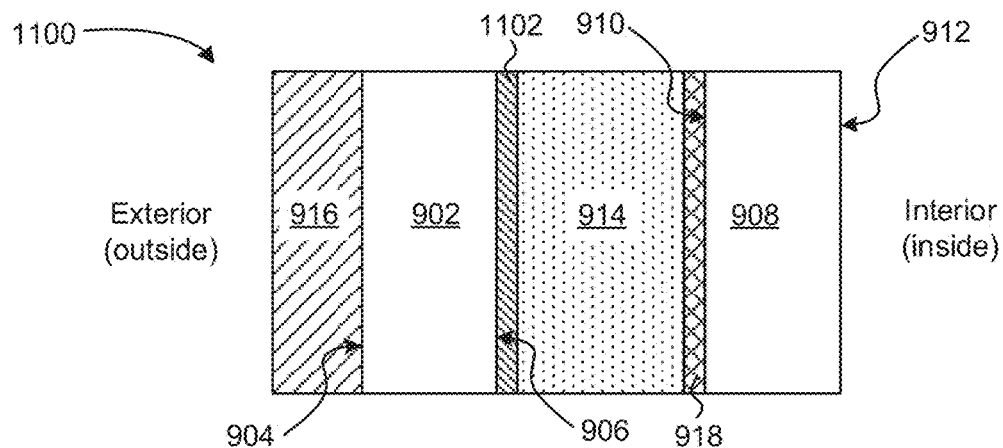
Figure 11E:
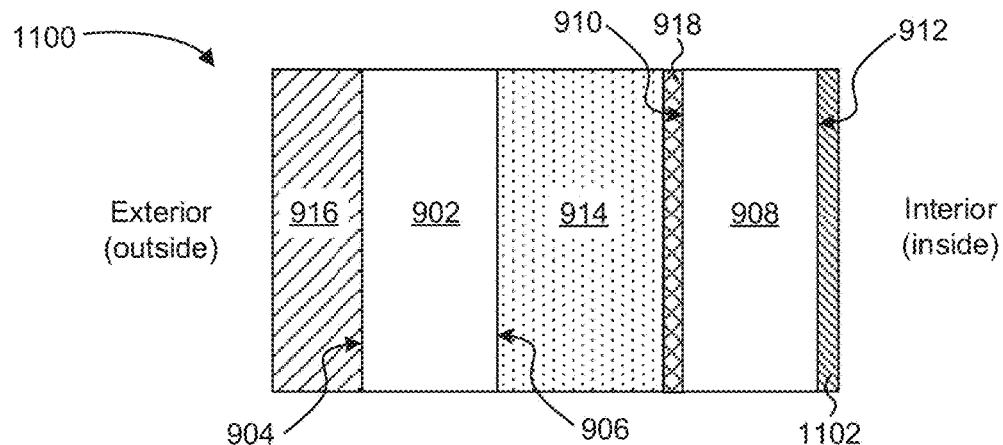
Figure 11F:
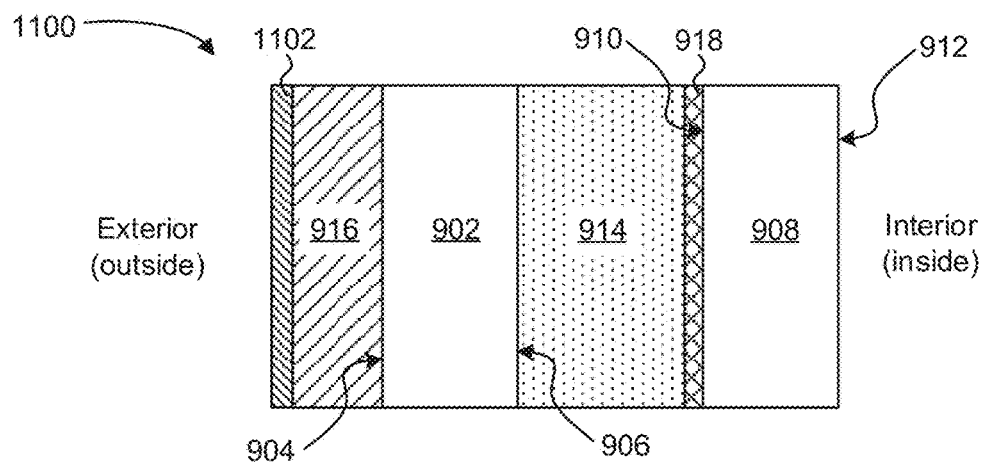

As further shown in the embodiments of FIGS. 11D-11F, the double glazing structure 1100 may include the low-e coating 918 deposited on the third surface 910 of the second panel 909. An electrochromic film 1102 may also be deposited on the second surface 906 of the first panel 902 (as shown in FIG. 11D), the fourth surface 912 of the second panel 908 (as shown in FIG. 11E), or on the first surface 904 of the first panel 902 (as shown in FIG. 11F).

Figure 11G:
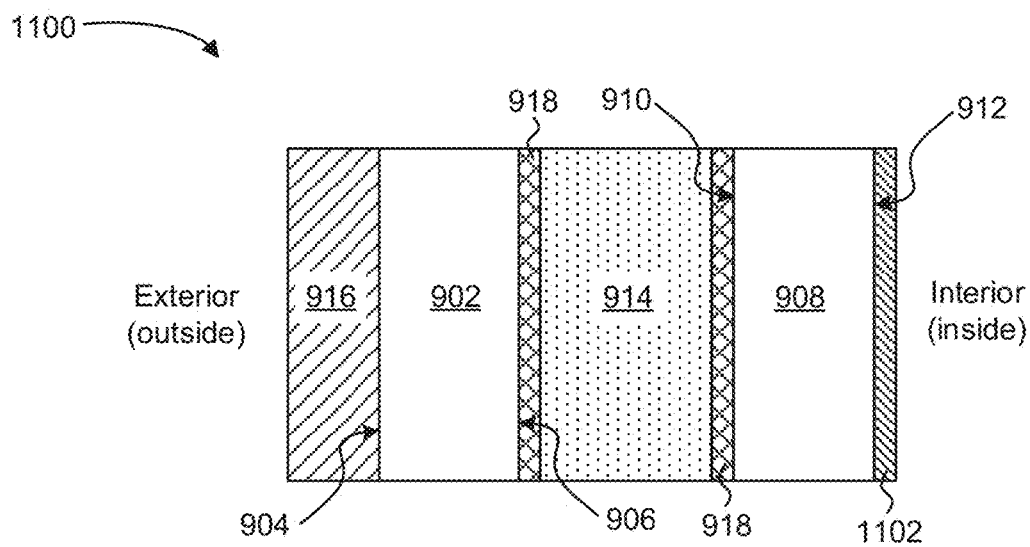
Figure 11H:
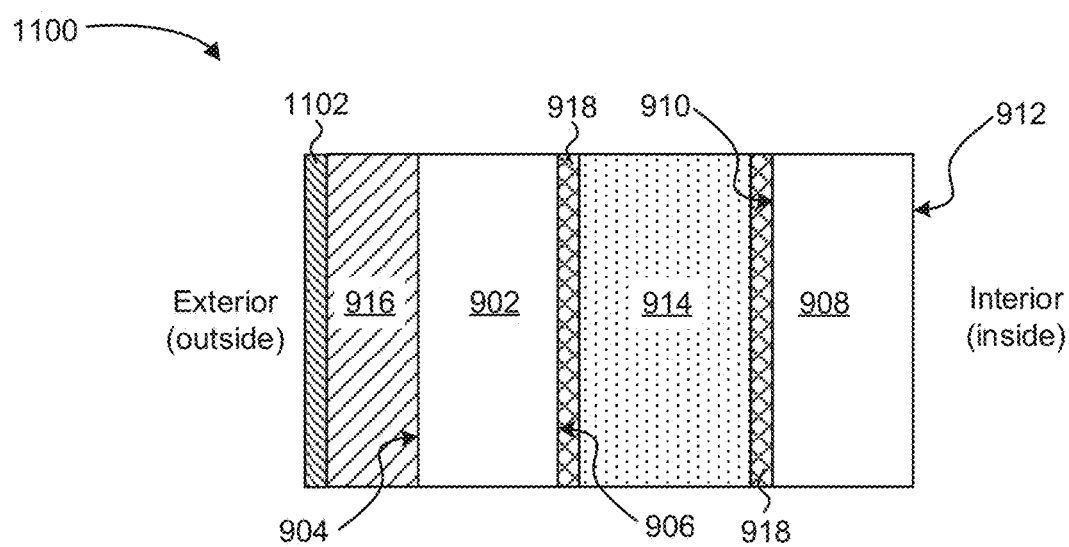

As additionally shown in the embodiments of FIGS. 11G-11H, the double glazing structure 1100 may include a first low-e coating 918 deposited on the second surface 906 of the first panel 902, and a second low-e coating 918 deposited on the third surface 910 of the second panel 909. An electrochromic film 1002 may also be deposited on the fourth surface 912 of the second panel 908 (as shown in FIG. 11G), or on the first surface 904 of the first panel 902 (as shown in FIG. 11H).

In certain embodiments, the electrochromic film 1102 of FIGS. 11A-11G may be deposited on a particular panel surface of the double glazing structure 1102 via the method 100 described in FIG. 1.

Figure 12:
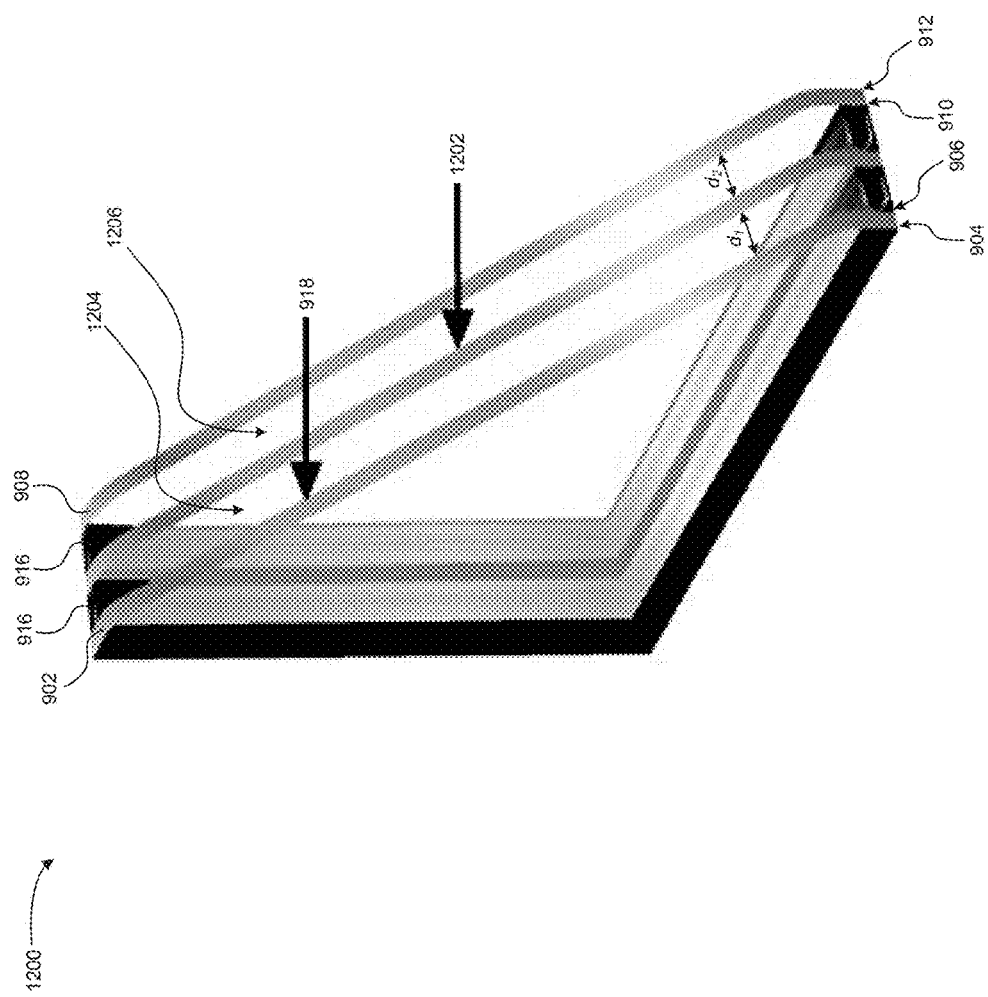
FIG. 12 is a simplified schematic of a double glazing low emissivity structure having at least three panels in spaced relation with each other, where at least one of the panels comprises an electrochromic film associated therewith, where the electrochromic film comprises a solid state electrolyte disposed therein, according to one exemplary embodiment.

C. Double Glazing Structure in which an Electrochromic Film is Disposed Between, and not in Physical Contact with, Two Panels FIG. 12 illustrates a double glazing structure 1200 having at least two panels, and an electrochromic film disposed between, and not in physical contact with, the two panels, where the electrochromic film comprises a solid state electrolyte disposed therein. The double glazing structure 1200 of FIG. 12 may be implemented in combination with other devices/features/components described herein, such as those described with reference to other embodiments. The double glazing structure 1200 may also be used in various applications and/or in permutations, which may or may not be noted in the illustrative embodiments/aspects described herein. For instance, the double glazing structure 1200 may include more or less features/components than those shown in FIG. 12, in some embodiments. Additionally, unless otherwise specified, one or more components of the double glazing structure 1200 may be of conventional material, design, and/or fabricated using known techniques, as would be appreciated by skilled artisans upon reading the present disclosure.

The double glazing structure 1200 of FIG. 12 is directed to an exemplary variation of the double glazing structure 900 of FIG. 9, and thus may have common numbering therewith. For instance, as shown in FIG. 12, the double glazing structure 1200 includes: a first panel 902 having first and second surfaces 904, 906; a second panel 908 having third and fourth surfaces 910, 912; one or more support units 916 configured to secure/attach one or more components of the structure 1000; and a low-e coating 918 deposited on at least one surface of at least one panel.

Moreover, as also shown in FIG. 12, the double glazing structure 1200 may include a central panel 1202 having an electrochromic film associated therewith, where the central panel (and associated electrochromic film) is positioned between the first and second panels 904, 908 in a configuration that prevents the central panel 1202 (and associated electrochromic film) from coming into physical contact with the first and second panels 904, 908. The central panel 1202 may be separated from the first panel 902 by a first distance, $d_1$, and separated from the second panel 908 by a second distance, $d_2$, where $d_1$ and $d_2$ may or may not be equal. In some embodiments, the region 1204 between the central panel 1202 and the first panel 902, and/or the region 1206 between the central panel 1202 and the second panel 908, may be comprised of dry air, $N_2$, Argon, or other insert gas, as would be appreciated by skilled artisans upon reading the present disclosure.

In some embodiments, the central panel 1202 may include a laminated structure having the electrochromic film disposed therein. Such a laminated structure may be formed via the method 300 of FIG. 3, and/or have the configuration, composition, etc. of the laminated structure 500 of FIG. 5.

In some embodiments, the central panel 1202 may include a substrate (e.g., a transparent glass substrate) having the electrochromic film deposited on a surface thereof. In one such embodiment, the electrochromic film may be deposited on the surface of the substrate that faces toward the first panel 902. In another such embodiment, the electrochromic film may be deposited on the surface of the substrate that faces toward the second panel 908. In various embodiments, the electrochromic film may be deposited/adhered/laminated on the substrate via the method 100 of FIG. 1.

In some embodiments, the central panel 1202 may be comprised solely of the electrochromic film.

In the embodiment shown in FIG. 12, the low e-coating 918 is deposited on the second surface 906 of the first panel 902. However, in another embodiment, the low e-coating 918 may be deposited on the third surface 910 of the second panel 908. In yet another embodiment, a first low-coating 918 may be deposited on the second surface 906 of the first panel 902, and a second low-e coating 918 may be deposited on the third surface 910 of the second panel 908. Regardless of the position of the low-e coating 918 (e.g., on the second surface 906 of the first panel 902, on the third surface 910 of the second panel 908, or on both the second surface 906 of the first panel 902 and the third surface 910 of the second panel 908), the central panel 1202 may include the electrochromic film in any of the configurations disclosed herein (e.g., the central panel 1202 comprising solely the electrochromic film, the central panel 1202 comprising the electrochromic film deposited directly on a surface of a substrate, or the central panel 1202 comprising a laminated structure with the electrochromic film disposed therein).

Electrochromic Film

Figure 13:
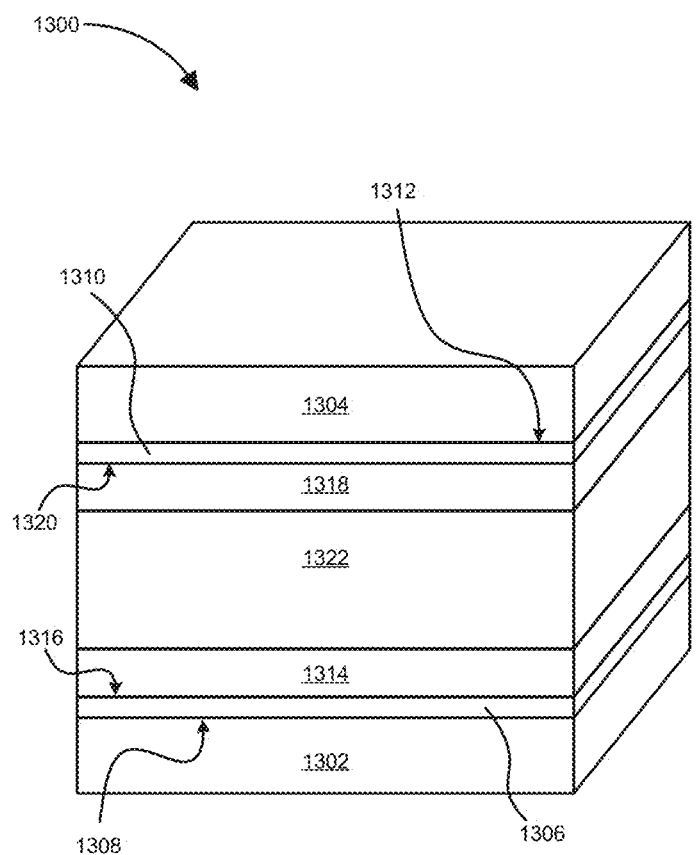
FIG. 13 is a simplified schematic of an electrochromic film comprising a solid state electrolyte disposed therein, according to one exemplary embodiment.

An exemplary, non-limiting schematic of an electrochromic film 1300 comprising a solid electrolyte disposed therein is shown in FIG. 13, according to one embodiment. It is important to note that the electrochromic film 1300 of FIG. 13 may be implemented in combination with other devices/features/components described herein, such as those described with reference to other embodiments/aspects. The electrochromic film 1300 may be used in various applications and/or in permutations, which may or may not be noted in the illustrative embodiments/aspects described herein. For instance, the electrochromic film 1300 may include more or less features/components than those shown in FIG. 13, in some embodiments. Additionally, unless otherwise specified, one or more components of the electrochromic film 1300 may be of conventional material, design, and/or fabricated using known techniques (e.g., sputtering, chemical vapor deposition (CVD), physical vapor deposition (PVD), plasma-enhanced chemical vapor deposition (PECVD), spray coating, slot-die coating, dip coating, spin coating, printing, etc.), as would be appreciated by skilled artisans upon reading the present disclosure.

As shown in FIG. 13, the electrochromic film 1300 includes a first transparent substrate 1302 and a second transparent substrate 1304 in spaced, parallel relation with one another. The first and second substrates 1302, 1304 may have the same or different dimensions, comprise the same or different material, etc. Suitable material for the first substrate 1302 and/or the second substrate 1304 may include, but is not limited to, glass, polymeric materials, plastic materials, and/or other materials which are transparent in at least part of the visible region of the electromagnetic spectrum. In some embodiments, the first and second substrates 1302, 1304 may comprise glass.

As also shown in FIG. 13, a first transparent electrically conductive film 1306 is deposited on the interior surface 1308 of the first substrate 1302 to act as an electrode. A second transparent electrically conductive film 1310 is also deposited on the interior surface 1312 of the second substrate 1304 to act as electrode. The first and second electrically conductive films 1306, 1310 may have the same or different dimensions, comprise the same or different material, etc. The first and second electrically conductive films 1306, 1310 may also each independently have a single layer or multilayer structure. Suitable material for the first and second electrically conductive films 1306, 1310 may include, but is not limited to, tin doped indium oxide (ITO), fluorine doped indium oxide, antimony doped indium oxide, zinc doped indium oxide, aluminum doped zinc oxide, silver nano wire, metal mesh, combinations thereof, and/or other such transparent material exhibiting sufficient electrical conductance. In preferred aspects, the first and second electrically conductive films 1306, 1310 may comprise ITO.

The electrochromic device 1300 may additionally include an electrical power supply (not shown) configured to supply voltage between the first and second electrically conductive films 1306, 1310.

As further shown in FIG. 13, a layer 1314 of electrochromic material is deposited on the interior surface 1316 of the first electrically conductive film 1306. The layer 1314 of electrochromic material is configured to effect a reversible color change upon reduction (gain of electrons) or oxidation (loss of electron) caused by exposure to an electrical current. In some embodiments, the layer 1314 of electrochromic material may be configured to change from a transparent state to a colored state, or from a colored state to another colored state, upon oxidation or reduction. In some embodiments, the layer 1314 of electrochromic material may be a polyelectrochromic material in which more than two redox states are possible, and may thus exhibit several colors.

In some embodiments, the layer 1314 of electrochromic material may comprise an organic electrochromic material, an inorganic electrochromic material, a mixture of both, etc. The layer 1314 of electrochromic material may also be a reduction colored material (i.e., a material that becomes colored upon acquisition of electrons), or an oxidation colored material (i.e., a material that becomes colored upon the loss of electrons).

In some embodiments, the layer 1314 of electrochromic material may include a metal oxide such as $MoO_3$, $V_2O_5$, $Nb_2O_5$, $WO_3$, $TiO_2$, $Ir(OH)_x$, $SrTiO_3$, $ZrO_2$, $La2O_3$, $CaTiO_3$, sodium titanate, potassium niobate, combinations thereof, etc. In some embodiments, the layer 1314 of electrochromic material may include a conductive polymer such as poly-3,4-ethylenedioxy thiophene (PEDOT), poly-2,2'-bithiophene, polypyrrole, polyaniline (PANT), polythiopene, polyisothianaphthene, poly(o-aminophenol), polypyridine, polyindole, polycarbazole, polyquinone, octacyanophthalocyanine, combinations thereof, etc. Moreover, in some embodiments, the layer 1314 of electrochromic material may include materials, such as viologen, anthraquinone, phenocyazine, combinations thereof, etc. Additional examples of electrochromic materials, particularly those including multicolored electrochromic polymers, may be found in U.S. Patent Application No. 62/331,760, filed May 4, 2016, the entirety of which is herein incorporated by reference.

As additionally shown in FIG. 13, a charge storage layer 1318 is deposited on the interior surface 1320 of the second electrically conductive film 1310. Suitable materials for the charge storage layer 1318 may include, but are not limited to, vanadium oxide, binary oxides (e.g., CoO, $IrO_2$, MnO, NiO, and $PrO_x$), ternary oxides (e.g., $Ce_xV_yO_z$), etc.

In some embodiments, the charge storage layer 1318 may be replaced with an optional second layer of electrochromic material. This optional second layer of electrochromic material may have the same or different dimensions, comprise the same or different composition, etc., as the first layer 1314 of electrochromic material.

The electrochromic device 1300 also includes an electrolyte layer 1322 positioned between the layer 1314 of electrochromic material and the charge storage layer 1318. In some embodiments, the electrolyte layer 1322 may include a liquid electrolyte as known in the art. In some embodiments, the electrolyte layer 1322 may include a solid state electrolyte, including but not limited to, $Ta_2O_5$, MgF, $Li_3N$, $LiPO_4$, $LiBO_2$-$Li_2SO_4$, etc. In some embodiments, the electrolyte layer 1322 may include a polymer based electrolyte comprising an electrolyte salt (e.g., LiTFSI, $LiPF_6$, $LiBF_4$, $LiClO_4$, $LiCF_3SO_3$, $LiN(CF_3SO_2)_2$, LiSbFg, $LiAsF_6$, $LiN(CF_3CF_2SO_2)_2$, $(C_2H_5)_4NBF_4$, $(C_2H_5)_3CH_3NBF_4$, LiI, etc.), a polymer matrix (e.g., polyethylene oxide, poly(vinylidene fluoride) (PVDF), poly(methyl methacrylate) (PMMA), polyethylene oxide (PEO), poly(acrylonitrile) (PAN), polyvinyl nitrile, etc.), and one or more optional plasticizers (e.g., glutaronitrile, succinonitrile, adiponitrile, fumaronitrile, etc.).

In some embodiments, the electrolyte layer 1322 comprises a solid polymer electrolyte. In one embodiment, the solid polymer electrolyte comprises a polymer framework, at least one solid plasticizer, and at least one electrolyte salt. In some embodiments, the polymer framework may include a polar polymer material having an average molecular weight of about 10,000 Daltons or greater. In particular embodiments, the polar polymer material may have an average molecular weight in a range from about 10,000 Daltons to about 800,000,000 Daltons. In some embodiments, the polar polymer material may be present in an amount ranging from about 15 wt. % to about 80 wt. % based on the total weight of the solid polymer electrolyte.

The aforementioned polar polymer material may include one or more polar polymers, each of which may include one or more of: C, N, F, O, H, P, F, etc. Suitable polar polymers may include, but are not limited to, polyethylene oxide, poly(vinylidene fluoride-hexafluoropropylene, poly(methyl methacrylate), polyvinyl nitrile, combinations thereof, etc. In embodiments where a plurality of polar polymers is present, the polymers may be crosslinked to form a network having enhanced mechanical properties.

The polar polymer material may have a sufficient amorphicity so as to achieve sufficient ion conductivity. Amorphous polymer materials typically exhibit high ion conductivities. Accordingly, in some embodiments, the polar material disclosed herein may have an amorphous, or a substantially amorphous, microstructure.

In some embodiments, the polar polymer material may have a semi-crystalline or crystalline microstructure. In such cases, various modifications may be implemented with respect to the polymer material to suppress the crystallinity thereof. For instance, one modification may involve use of branched polar polymers, linear random copolymers, block copolymers, comb polymers, and/or star-shaped polar polymers. Another modification may include incorporation of an effective amount of solid plasticizers in the polar polymer material, as discussed in greater detail below.

Various properties of the polar polymer material also may be selected and/or modified to maximize ion conductivity. These properties may include, but are not limited to, glass transition temperature, segmental mobility/flexibility of the polymer backbone and/or any side chains attached thereto, orientation of the polymers, etc.

As noted above, the presently disclosed solid electrolyte may include at least one solid plasticizer. The at least one solid plasticizer may be substantially miscible in the polymer framework of the solid plasticizer. The at least one solid plasticizer may include an organic material (e.g., small, solid organic molecules) and/or an oligomeric polymer material, in some embodiments. In various embodiments, the at least one solid plasticizer may be selected from the group including glutaronitrile, succinonitrile, adiponitrile, fumaronitrile, and combinations thereof.

In some embodiments, a plurality of solid plasticizers may be present in the polymer framework, where each plasticizer may independently include an organic material (e.g., small, solid organic molecules) and/or an oligomeric polymer material. Particularly, each plasticizer may independently be glutaronitrile, succinonitrile, adiponitrile, fumaronitrile, etc. Moreover, the dimensions of at least two, some, a majority, or all of the plasticizers may be the same or different as one another.

In some embodiments, the total amount of solid plasticizer may be in a range from about 20 wt. % to about 80 wt. % based on the total weight of the solid electrolyte.

As additionally noted above, the solid polymer electrolyte may include at least one electrolyte salt. In some embodiments, the at least one electrolyte salt may comprise an organic salt. In some embodiments, the at least one electrolyte salt may comprise an inorganic salt. Suitable electrolyte salts may include, but are not limited to, LiTFSI, LiPF$_6$, LiBF$_4$, LiClO$_4$, LiCF$_3$SO$_3$, LiN(CF$_3$SO$_2$)$_2$, LiSbFg, LiAsF$_6$, LiN(CF$_3$CF$_2$SO$_2$)$_2$, (C$_2$H$_5$)$_4$NBF$_4$, (C$_2$H$_5$)$_3$CH$_3$NBF$_4$, LiI, combinations thereof, etc. In some embodiments, the total amount of electrolyte salt may be in a range from about 10 wt. % to about 50 wt. % based on the total weight of the solid electrolyte.

The solid polymer electrolyte is distinguishable from conventional liquid electrolytes, as well as gel polymer electrolytes including an ionic liquid therein. In other words, the presently disclosed solid polymer electrolyte may be an all solid polymer electrolyte, and does not include any liquid or gel components therein. The presently disclosed solid polymer electrolyte may also be transparent in some aspects. Additionally, the solid polymer electrolyte may have an ion conductivity in a range from about $10^{-7}$ S/cm to about $10^{-3}$ S/cm.

Methods of making the presently disclosed solid polymer electrolyte may include synthesis, polymerization, solvation, etc. processes as known in the art. In one particular, non-limiting embodiment, a method of making the presently disclosed polymer electrolyte may include: (a) combining the polymer framework, the at least one plasticizer, and the at least one electrolyte salt in an appropriate solvent; and (b) removing the solvent to obtain the solid polymer electrolyte. Exemplary solvents may include, but are not limited to, acetone, methanol, tetrahydrofuran, etc. In some embodiments, one or more experimental parameters may be optimized to facilitate the dissolving of the polymer framework, plasticizer, and electrolyte salt in the solvent. These experimental parameters may include the components remain in the solvent, agitation/stirring of the solvent, etc.

In some embodiments, the electrolyte layer 1322 of FIG. 13 comprises a solid polymer electrolyte, such as the solid polymer electrolytes described above, and does not include any liquid or gel electrolyte. Such a solid polymer electrolyte (i) has sufficient mechanical strength yet is versatile in shape so as to allow easy formation into thin films, and thin-film shaped products; (ii) avoids issues related to adhesion and print processing affecting conventional electrolytes; (iii) provides stable contact between the electrolyte/electrode interfaces (those with and without the electrochromic material coating thereon); (iv) avoids the problem of leakage commonly associated with liquid electrolytes; (v) has desirable non-toxic and non-flammable properties; (vi) avoids problems associated with evaporation due to its lack of vapor pressure; (vii) exhibits improved ion conductivities as compared to convention polymer electrolytes; etc.

Additional examples of electrolyte materials, particularly those including solid polymer electrolytes, may be found in U.S. Patent Application No. 62/323,407, filed Apr. 15, 2016, the entirety of which is herein incorporated by reference.

EXAMPLES

1. Electrochromic Film Laminated Directly on a Glass Substrate

An electrochromic film was fabricated in the configuration of: PET/ITO/Electrochromic Layer/Solid State Electrolyte Layer/Charge Storage Layer/ITO/PET. The basic structure of the electrochromic film is provided in FIG. 13. Both the bottom electrode and the top electrode of the electrochromic film are flexible PET/ITO films. The sheet resistance of the film ranges from 1 Ω/sq to 200 Ω/sq. The transmission of the film ranges from 95% to 10%.

Fabrication of the electrochromic film involved depositing the electrochromic layer and the solid state electrolyte in sequence on the bottom electrode using slot-die coating. The charge storage layer was deposited on the top electrode using slot-die coating. Subsequently, the bottom electrode and the top electrode were laminated together.

To laminate the electrochromic film directly onto the glass, the glass's surface was first thoroughly cleaned. Following the process described in method 100 of FIG. 1, the electrochromic film was laminated onto the glass.

Figure 14:
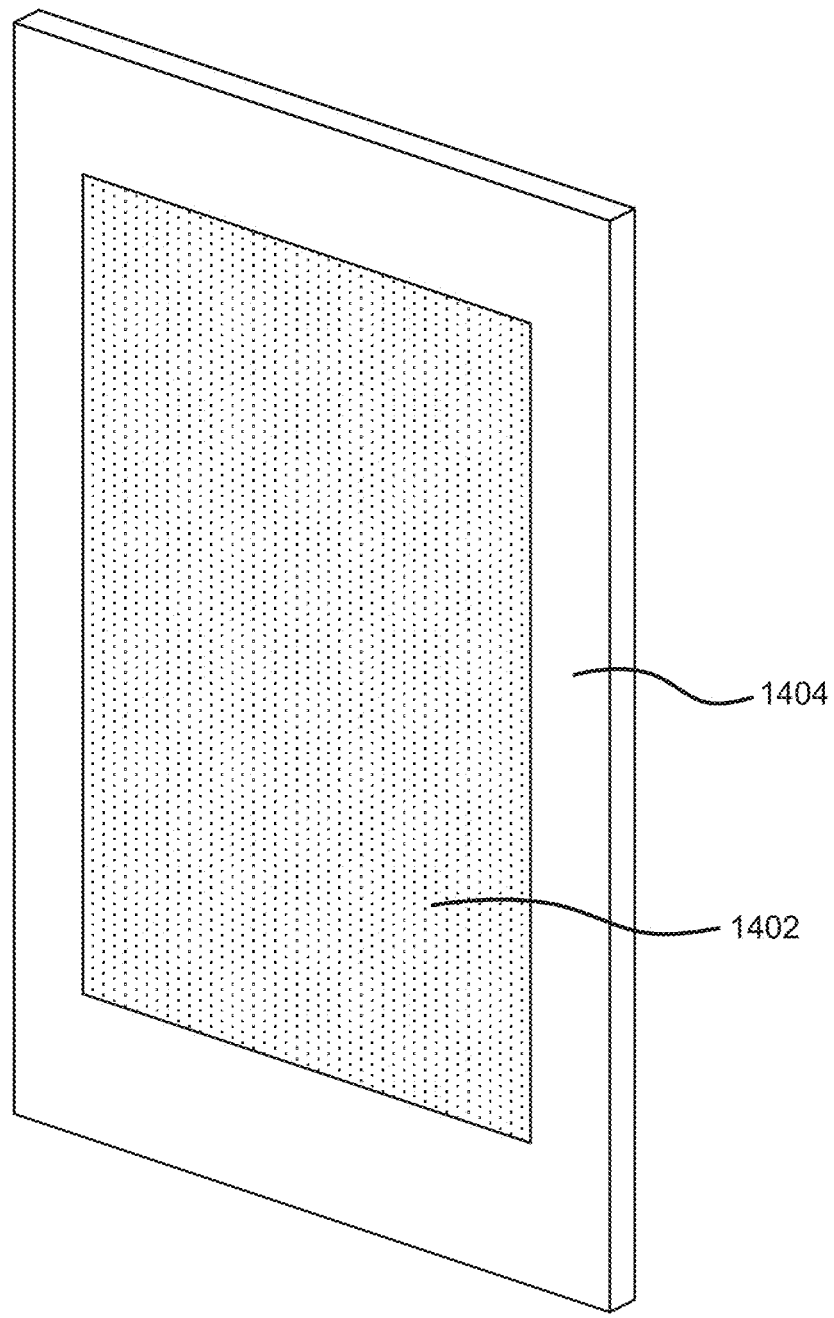
FIG. 14 is a simplified schematic of an electrochromic film directly laminated on a glass substrate, where the electrochromic film comprises a solid state electrolyte disposed therein, according to one exemplary embodiment.

FIG. 14 provides a schematic representation of the resulting structure comprising the glass substrate 1402 with the electrochromic film 1404 laminated directly thereon.

2. Laminated Glass Structure with an Electrochromic Film Disposed Therein

The electrochromic film comprising a solid state electrolyte therein was fabricated as disclosed in Example 1. To laminate the electrochromic film inside two glass panels, the electrochromic film was interposed (sandwiched) between two EVA adhesive interlayers, and placed between two glass panels. The assembly was put inside a vacuum oven to bake at 125° C. for 30 minutes.

Figure 15:
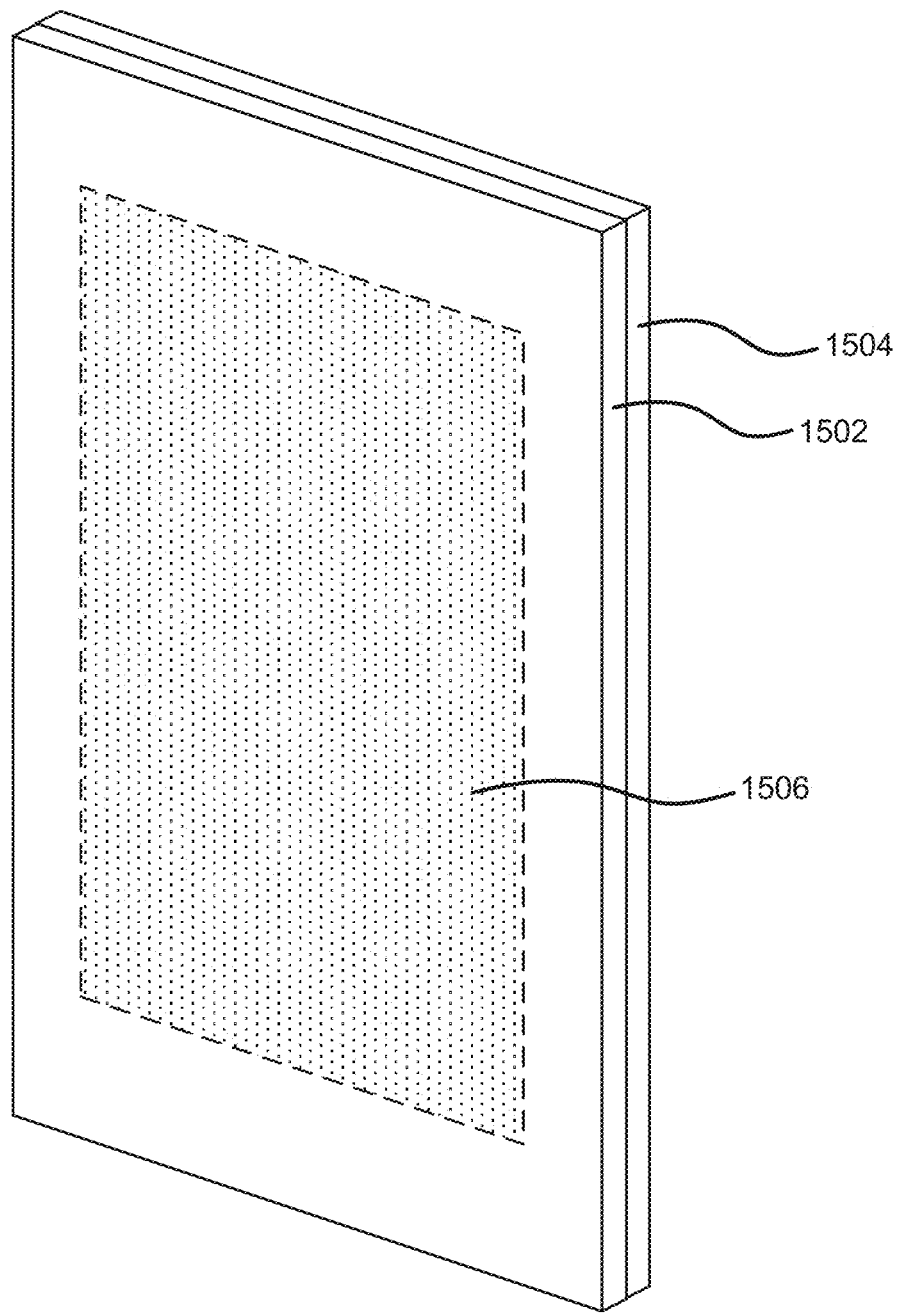
FIG. 15 is simplified schematic of a laminated glass structure with an electrochromic film disposed therein, where the electrochromic film comprises a solid state electrolyte disposed therein, according to one exemplary embodiment.

FIG. 15 provides a schematic representation of the resulting laminated glass structure comprising the two glass panels 1502, 1504 and the electrochromic film 1506 therebetween.

3. Smart Window Module Comprising a Laminated Glass Structure with an Electrochromic Film Disposed Therein Laminated glass with an electrochromic film inside was fabricated as described in Example 2. Subsequently, the laminated glass having the electrochromic film inside was integrated with a frame to function as a smart window module.

Figure 16A:
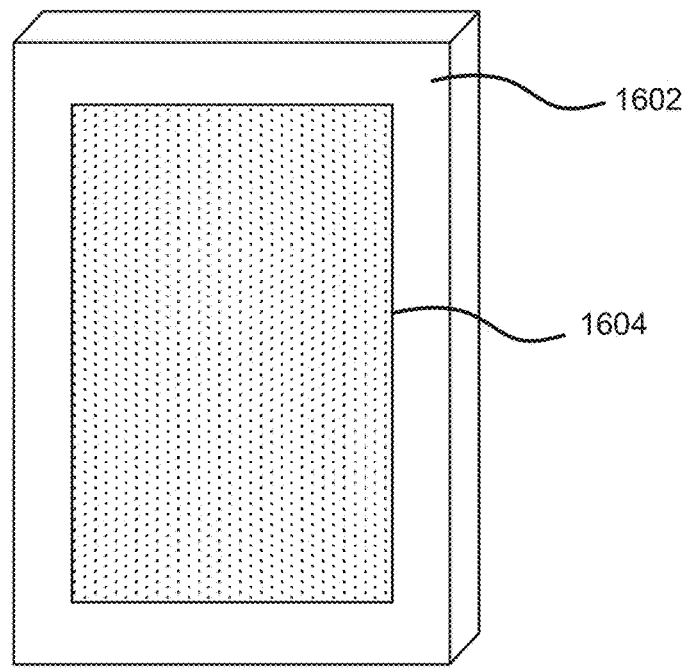
FIGS. 16A-16B are simplified schematics of a smart window module in a transparent state and an opaque state, respectively, where the smart window module comprises a laminated glass structure with an electrochromic film disposed therein, and where the electrochromic film comprises a solid state electrolyte disposed therein.
Figure 16B:
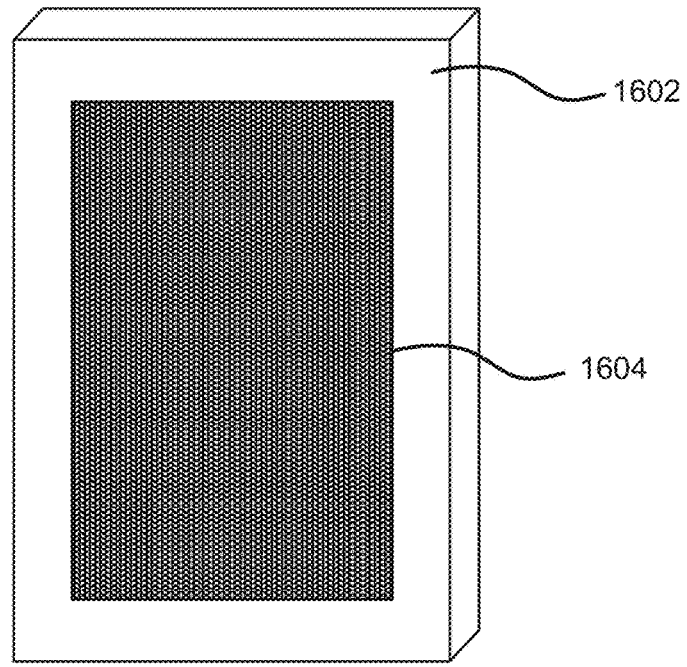

FIGS. 16A-16B provide schematic representations of the resulting smart window module comprising the support unit 1602, and the laminated, transparent glass structure 1604 having the electrochromic film inside. As particularly shown in FIG. 16A-16B, the electrochromic film is in a transparent state and an opaque state, respectively, as indicated by the different stippling patterns.

4. Formation of a Solid Polymer Electrolyte Configured for Use in an Electrochromic Film An exemplary solid polymer electrolyte as discussed herein was prepared as follows.

The following components were combined: 40 wt. % PEO having a molecular weight of 1,000,000; 10 wt. % PEO having a molecular weight of 1,500; 30 wt. % succinonitrile; and 20 wt. %, LiClO$_4$. The combined components were mixed in an acetone solvent and stirred overnight to obtain a solution. The solution was processed and deposited on a PEDOT-PSS electrochromic layer via spin-coating, dip-coating, drop-casting, blade coating, screen printing, etc. After drying the solvent, the resulting solid electrolyte was found to be transparent with an ion conductivity of about 10$^{-4}$ S/cm.

An electrochromic film was formed comprising a first transparent ITO-coated glass electrode on which the PEDOT-PESS electrochromic layer was deposited, as well as a second transparent ITO-coated glass electrode, where the solid electrolyte was located/sandwiched between the transparent ITO/PEDOT-PSS layers and the second transparent ITO glass layer. This particular electrochromic device was found to switch to a blue color at 5 V, and switch back to colorless at −2 V.

APPLICATIONS/USES

Embodiments of the methods and systems disclosed herein may be used in various applications, devices, industries etc. For instance, several exemplary methods for integrating one or more electrochromic films onto and/or within a substrate structure have been presented herein. Such methods allow for a low cost, reproducible, and convenient process by which an end user may integrate the electrochromic film(s) with a desired substrate structure. Applications for such methods and the resulting products include, but are not limited to smart window and display technology, e.g., anti-glare car mirrors, smart windows configured to modulate the transmission or reflected solar radiation for use in cars, aircrafts, buildings, and the like; protective eyewear; camouflage and/or chameleonic materials; polymer photovoltaic devices; field effect transistors; batteries; supercapacitors; light emitting diodes; and other electrochromic and electronic devices.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method for forming a structure having an electrochromic device therein, the method comprising:
    interposing an electrochromic device between a first adhesive interlayer and a second adhesive interlayer, wherein the first adhesive interlayer is interposed between the electrochromic device and a first substrate, and the second adhesive interlayer is interposed between the electrochromic device and a second substrate, wherein the electrochromic device comprises an electrochromic material, a solid state electrolyte, and a charge storage layer; and
    bonding the electrochromic device to the first substrate via the first adhesive interlayer, and to the second substrate via the second adhesive interlayer, to form a laminated structure having the electrochromic device therein,
    wherein the solid state electrolyte comprises:
        an electrolyte salt selected from the group of LiTFSI, LiPF$_6$, LiBF$_4$, LiClO$_4$, LiCF$_3$SO$_3$, LiN(CF$_3$SO$_2$)$_2$, LiSbFg, LiAsF$_6$, LiN(CF$_3$CF$_2$SO$_2$)$_2$, (C$_2$H$_5$)$_4$NBF$_4$, (C$_2$H$_5$)$_3$CH$_3$NBF$_4$, and LiI; and
        a polymer matrix including one or more polar polymers crosslinked to form a network, wherein the one or more polar polymers have a semi-crystalline or crystalline microstructure.

2. The method of claim 1, wherein at least one of the first adhesive interlayer and the second adhesive interlayer includes a thermosetting polymer material.

3. The method of claim 1, wherein at least one of the first substrate, the second substrate, the first adhesive interlayer, and the second adhesive interlayer is transparent.

4. The method of claim 1, further comprising attaching one or more peripheral portions of the laminated structure having the electrochromic device therein to a support unit to form a module, wherein the support unit comprises one or more electrical components configured to control operation of the electrochromic device disposed within the laminated structure.

5. A structure comprising at least one electrochromic device, the structure comprising:
    a first panel having a first surface and a second surface;
    a second panel having a third surface and a fourth surface, the third surface of the second panel facing toward the second surface of the first panel;
    a spacer interposed between the first panel and the second panel;
    a low-emissivity coating deposited on at least one of the second surface of the first panel and the third surface of the second panel; and
    an electrochromic device deposited on at least one of the first surface of the first panel, the second surface of the first panel, the third surface of the second panel, and the fourth surface of the second panel, with the proviso that the electrochromic device and the low-emissivity coating are not deposited on a same surface at a same time, wherein the electrochromic device comprises an electrochromic material, a solid state electrolyte, and a charge storage layer; and
    wherein the solid state electrolyte comprises:
        an electrolyte salt selected from the group of LiTFSI, LiPF$_6$, LiBF$_4$, LiClO$_4$, LiCF$_3$SO$_3$, LiN(CF$_3$SO$_2$)$_2$, LiSbFg, LiAsF$_6$, LiN(CF$_3$CF$_2$SO$_2$)$_2$, (C$_2$H$_5$)$_4$NBF$_4$, (C$_2$H$_5$)$_3$CH$_3$NBF$_4$, and LiI; and
        a polymer matrix including one or more polar polymers crosslinked to form a network, wherein the one or more polar polymers have a semi-crystalline or crystalline microstructure.

6. The structure of claim 5, wherein the low-emissivity coating is deposited on the second surface of the first panel, and wherein the electrochromic device is deposited on the first surface of the first panel, the third surface of the second panel, or the fourth surface of the second panel.

7. The structure of claim 5, wherein the low-emissivity coating is deposited on the third surface of the second panel, and wherein the electrochromic device is deposited on the first surface of the first panel, the second surface of the first panel, or the fourth surface of the second panel.

8. The structure of claim 5, wherein the low-emissivity coating is deposited on the second surface of the first panel, and another low-emissivity coating is deposited on the third surface of the second panel, and wherein the electrochromic device is deposited on the first surface of the first panel or on the fourth surface of the second panel.

9. A structure comprising at least one laminated structure having an electrochromic device disposed therein, the structure comprising:

a first panel having a first surface and a second surface;
a second panel having a third surface and a fourth surface, the third surface of the second panel facing toward the second surface of the first panel;
a spacer interposed between the first panel and the second panel; and
a low-emissivity coating deposited on at least one of the second surface of the first panel and the third surface of the second panel,
wherein at least one of the first panel and the second panel comprises a laminated structure having an electrochromic device disposed therein, wherein the electrochromic device comprises an electrochromic material, a solid state electrolyte, and a charge storage layer; and
wherein the solid state electrolyte comprises:
an electrolyte salt selected from the group of LiTFSI, LiPF$_6$, LiBF$_4$, LiClO$_4$, LiCF$_3$SO$_3$, LiN(CF$_3$SO$_2$)$_2$, LiSbFg, LiAsF$_6$, LiN(CF$_3$CF$_2$SO$_2$)$_2$H$_5$)$_3$CH$_3$NBF$_4$, and LiI; and
a polymer matrix including one or more polar polymers crosslinked to form a network, wherein the one or more polar polymers have a semi-crystalline or crystalline microstructure.

10. The structure of claim 9, wherein the laminated structure having the electrochromic device disposed therein comprises:
a first substrate;
a first adhesive interlayer;
the electrochromic device;
a second adhesive interlayer; and
a second substrate,
wherein the first adhesive interlayer is interposed between the electrochromic device and the first substrate, and the second adhesive interlayer is interposed between the electrochromic device and the second substrate.

11. The structure of claim 10, wherein the first panel comprises the laminated structure having the electrochromic device disposed therein, and wherein the low-emissivity coating is deposited on the third surface of the second panel or on the second surface of the first panel.

12. The structure of claim 10, wherein the second panel comprises the laminated structure having the electrochromic device disposed therein, and wherein the low-emissivity coating is deposited on the third surface of the second panel or on the second surface of the first panel.

13. A multi-panel structure having an electrochromic device associated with at least one panel, the structure comprising:
a first panel having a first surface and a second surface;
a second panel having a third surface and a fourth surface;
a central panel interposed between the first panel and the second panel, the central panel having a fifth surface facing toward the second surface of the first panel, and a sixth surface facing toward the third surface of the second panel, wherein the first panel, the second panel and the central panel are in spaced relation with each other;
a low-emissivity coating deposited on at least one of the second surface of the first panel and the third surface of the second panel; and
an electrochromic device associated with the central panel, wherein the electrochromic device comprises an electrochromic material, a solid state electrolyte, and a charge storage layer; and
wherein the solid state electrolyte comprises:
an electrolyte salt selected from the group of LiTFSI, LiPF$_6$, LiBF$_4$, LiClO$_4$, LiCF$_3$SO$_3$, LiN(CF$_3$SO$_2$)$_2$, LiSbFg, LiAsF$_6$, LiN(CF$_3$CF$_2$SO$_2$)$_2$, (C$_2$H$_5$)$_4$NBF$_4$, (C$_2$H$_5$)$_3$CH$_3$NBF$_4$, and LiI; and
a polymer matrix including one or more polar polymers crosslinked to form a network, wherein the one or more polar polymers have a semi-crystalline or crystalline microstructure.

14. The structure of claim 13, wherein the low-emissivity coating is deposited on the second surface of the first panel, and wherein the electrochromic device is deposited on the fifth surface or the sixth surface of the central panel.

15. The structure of claim 13, wherein the low-emissivity coating is deposited on the third surface of the second panel, and wherein the electrochromic device is deposited on the fifth surface or the sixth surface of the central panel.

16. The structure of claim 13, wherein the low-emissivity coating is deposited on the second surface of the first panel, and another low-emissivity coating is deposited on the third surface of the second panel, and wherein the electrochromic device is deposited on the fifth surface or the sixth surface of the central panel.

17. The structure of claim 13, wherein the central panel comprises a laminated structure having the electrochromic device disposed therein, the laminated structure comprising:
a first substrate;
a first adhesive interlayer;
the electrochromic device;
a second adhesive interlayer; and
a second substrate,
wherein the first adhesive interlayer is interposed between the electrochromic device and the first substrate, and the second adhesive interlayer is interposed between the electrochromic device and the second substrate.

18. The structure of claim 17, wherein the low-emissivity coating is deposited on the third surface of the second panel or on the second surface of the first panel.

* * * * *